United States Patent
Borg et al.

(10) Patent No.: US 11,726,602 B2
(45) Date of Patent: Aug. 15, 2023

(54) METHODS AND SYSTEMS FOR FACILITATING CLEANING OF A SHARED ENVIRONMENT

(71) Applicant: Meld CX Pty Ltd, Cremorne (AU)

(72) Inventors: Stephen Borg, Cremorne (AU); Clinton Capuzzi, Cremorne (AU); Thor Turrecha, Cremorne (AU)

(73) Assignee: Meld CX Pty Ltd, Cremorne (AU)

( * ) Notice: Subject to any disclaimer, the term of this patent is extended or adjusted under 35 U.S.C. 154(b) by 0 days.

(21) Appl. No.: 18/072,695

(22) Filed: Nov. 30, 2022

(65) Prior Publication Data

US 2023/0088921 A1    Mar. 23, 2023

Related U.S. Application Data

(63) Continuation of application No. PCT/AU2021/050536, filed on Jun. 1, 2021.

(30) Foreign Application Priority Data

Jun. 1, 2020  (AU) ............................... 2020901795

(51) Int. Cl.
  *G06F 3/041*   (2006.01)
(52) U.S. Cl.
  CPC ................... *G06F 3/0416* (2013.01)
(58) Field of Classification Search
  None
  See application file for complete search history.

(56) References Cited

U.S. PATENT DOCUMENTS

| 2006/0180450 | A1  | 8/2006  | Clark et al. |
| 2009/0073128 | A1  | 3/2009  | Marsden et al. |
| 2010/0045623 | A1* | 2/2010  | Sakurai ................. G06F 3/0416 345/173 |
| 2011/0316688 | A1  | 12/2011 | Ranjan et al. |
| 2012/0206384 | A1  | 8/2012  | Marsden et al. |

(Continued)

FOREIGN PATENT DOCUMENTS

| JP | 2013019932 A | 1/2013 |
| WO | 2020027821 A1 | 2/2020 |

OTHER PUBLICATIONS

International Preliminary Report on Patentability dated Jul. 7, 2022 for International Application No. PCT/AU2021/050536, filed Jun. 1, 2021.

(Continued)

*Primary Examiner* — Stephen T. Reed
(74) *Attorney, Agent, or Firm* — Dinsmore & Shohl LLP

(57) ABSTRACT

Embodiments generally relate to a method for facilitating the cleaning of a touch screen display. The method comprises receiving data from the touch screen display, the data relating to at least one touch event recorded on the touch screen display within a predetermined time period; determining at least one touch metric based on the data; comparing the touch metric to a predetermined threshold value; in response to determining that the touch metric exceeds the predetermined threshold, sending a notification message to a staff computing device, the staff computing device being external to the touch screen display; and in response to receiving a response to the notification message, initiating a cleaning procedure.

20 Claims, 14 Drawing Sheets

(56) References Cited

U.S. PATENT DOCUMENTS

2016/0103750 A1    4/2016  Cooper et al.
2019/0128821 A1*  5/2019  Yang .................... G06F 3/0383
2021/0000991 A1*  1/2021  Kraus ...................... A61L 2/24

OTHER PUBLICATIONS

International Search Report and Written Opinion dated Jul. 16, 2021 for International Application No. PCT/AU2021/050536, filed Jun. 1, 2021.

* cited by examiner

METHODS AND SYSTEMS FOR FACILITATING CLEANING OF A SHARED ENVIRONMENT

CROSS-REFERENCE TO RELATED APPLICATIONS

This Application is a continuation of International Application No. PCT/AU2021/050536, filed Jun. 1, 2021, which claims priority to Australian Application No. AU 2020901795, filed Jun. 1, 2020, the entire contents of each of which are incorporated herein by reference.

TECHNICAL FIELD

Embodiments generally relate to methods and systems for facilitating cleaning of a shared environment. Specifically, embodiments relate to methods and systems for tracking use of a shared environment, and facilitating cleaning of the environment based on the tracked use.

BACKGROUND

Shared public environments including shared furniture, surfaces and touch screen displays such as those on self-service kiosks may be used by a plurality of individuals with varying levels of personal hygiene. Shared public surfaces such as touch screen displays are one of the main modes of disease transmission in a community. In order to prevent the spread of disease within a community, it is beneficial to clean surfaces that are regularly touched by individuals, such as touch screen displays. This may be done by generating a cleaning schedule, where the surface is cleaned on a periodic basis. However, this can be inefficient and ineffective to prevent the spread of bacteria, viruses and other pathogens.

It is desired to address or ameliorate one or more shortcomings or disadvantages associated with prior systems or methods for cleaning shared environments, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this document, a statement that an element may be "at least one of" a list of options is to be understood to mean that the element may be any one of the listed options, or may be any combination of two or more of the listed options.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a method for facilitating the cleaning of a touch screen display, the method comprising: receiving data from the touch screen display, the data relating to at least one touch event recorded on the touch screen display within a predetermined time period; determining at least one touch metric based on the data; comparing the touch metric to a predetermined threshold value; in response to determining that the touch metric exceeds the predetermined threshold, sending a notification message to a staff computing device, the staff computing device being external to the touch screen display; and in response to receiving a response to the notification message, initiating a cleaning procedure.

Some embodiments relate to a method for facilitating the cleaning of a touch screen display, the method comprising: receiving data from the touch screen display, the data relating to at least one touch event recorded on the touch screen display within a predetermined time period; determining at least one touch metric based on the data; comparing the touch metric to a predetermined threshold value; in response to determining that the touch metric exceeds the predetermined threshold, sending a notification message to a staff computing device; and in response to receiving a response to the notification message, initiating a cleaning procedure.

According to some embodiments, initiating the cleaning procedure comprises causing the touch screen display to enter a cleaning mode. In some embodiments, causing the touch screen display to enter a cleaning mode comprises disabling inputs of the touch screen display. In some embodiments, causing the touch screen display to enter a cleaning mode comprises causing touches recorded by the touch screen display to be recorded as cleaning touches.

In some embodiments, causing the touch screen display to enter a cleaning mode comprises causing touch data recorded within the predetermined time period to be displayed on the touch screen display based on the location at which each touch event occurred.

According to some embodiments, initiating the cleaning procedure comprises providing cleaning instructions to a user. In some embodiments, the cleaning instructions are provided via at least one of the staff computing device or the touch screen display.

According to some embodiments, the data includes at least one of: coordinate data relating to the location on the touch screen display at which the touch event was recorded; time data relating to the time at which the touch event was recorded; and type data relating to the type of touch event that was recorded.

Some embodiments further comprise: receiving data from at least one peripheral of the touch screen display, the data relating to at least one use event associated with use of at least one peripheral of the touch screen display; determining at least one use metric based on the data; comparing the use metric to a predetermined use threshold value; in response to determining that the touch metric exceeds the predetermined threshold, sending a notification message to a staff computing device; and in response to receiving a response to the notification message, initiating a peripheral cleaning procedure.

According to some embodiments, the metric comprises the number of touches recorded within the predetermined time period.

Some embodiments further comprise awaiting a notification that cleaning has finished, and terminating the cleaning procedure upon receiving the notification. In some embodiments, terminating the cleaning procedure comprises causing the touch screen display to return to a normal operating mode.

Some embodiments further comprise determining that the touch metric does not exceed the predetermined threshold and does exceed a predetermined warning threshold, sending a warning notification message the staff computing device.

Some embodiments further comprise comprising identifying the staff computing device is associated with the display, retrieving the contact information for the staff computing device, and using the retrieved contact information to send the notification message.

Some embodiments further comprise determining that a response to the notification message was not received within a predetermined time period, and initiating an escalation procedure, the escalation procedure comprising sending an escalation message to an additional staff computing device, the additional staff computing device being external to the touch screen display.

According to some embodiments, the response to the notification message is received from the staff computing device.

Some embodiments relate to a method of prompting compliance with a cleaning program the method comprising: receiving touch event data associated with a touch screen display, wherein the touch event data relates to at least one touch event recorded on the display while the display was not in a cleaning mode, and wherein the touch event data comprises location data relating to a location of the at least one touch event; displaying the touch event data on the display in at least one location corresponding to the location data; receiving cleaning data from the touch screen display, the cleaning data relating to at least one touch event recorded on the touch screen display while the touch screen display was in a cleaning mode; comparing the cleaning data to the received touch event; in response to determining that the cleaning data corresponds to the previously recorded touch event data, modifying the touch event data by erasing at least some touch event data and modifying the location data associated with at least some touch event data; and displaying the updated touch event data on the display.

Some embodiments further comprise, upon determining that all touch event data has been erased, determining that the touch screen display has been cleaned.

Some embodiments relate to a method of prompting compliance with a cleaning program the method comprising: receiving cleaning data from a touch screen display, the cleaning data relating to at least one touch event recorded on the touch screen display while the touch screen display was in a cleaning mode; comparing the cleaning data to previously recorded touch event data, wherein the previously recorded touch event data was recorded while the touch screen display was not in a cleaning mode; in response to determining that the cleaning data corresponds to the previously recorded touch event data, determining that the touch screen display has been cleaned; and in response to determining that the touch screen display has been cleaned, resetting the previously recorded touch event data.

In some embodiments, the cleaning data includes coordinate data relating to the location on the touch screen display at which the touch event was recorded. According to some embodiments, determining that the cleaning data corresponds to the previously recorded touch event data comprises determining that the cleaning data relates to touch events that occurred in a corresponding area of the touch screen display as the previously recorded touch event data.

According to some embodiments, resetting the previously recorded touch event data comprises erasing the previously recorded touch data.

Some embodiments relate to a system for facilitating the cleaning of a touch screen display, the system comprising: a touch screen display; and a server system in communication with the touch screen display, wherein the server system is configured to execute the method of some other embodiments.

Some embodiments further comprise a staff computing device in communication with the server system.

According to some embodiments, the server is a cloud based server system.

Some embodiments relate to a method for facilitating the cleaning of a shared surface, the method comprising: receiving data from an imaging device, the data relating to at least one contact event determined to have occurred to the shared surface within a predetermined time period; determining at least one contact metric based on the data; comparing the contact metric to a predetermined threshold value; in response to determining that the contact metric exceeds the predetermined threshold, sending a notification message to a staff computing device, the staff computing device being external to the shared surface; and in response to receiving a response to the notification message, initiating a cleaning procedure.

Some embodiments relate to a method for facilitating the cleaning of a shared surface, the method comprising: receiving data from a sensor device, the data relating to at least one contact event determined to have occurred to the shared surface within a predetermined time period; determining at least one contact metric based on the data; comparing the contact metric to a predetermined threshold value; in response to determining that the contact metric exceeds the predetermined threshold, sending a notification message to a staff computing device; and in response to receiving a response to the notification message, initiating a cleaning procedure.

In some embodiments, the data includes at least one of: coordinate data relating to the location on the shared surface at which the touch event was recorded; and time data relating to the time at which the touch event was recorded.

In some embodiments, initiating the cleaning procedure comprises providing cleaning instructions to a user. According to some embodiments, the cleaning instructions are provided via the staff computing device.

According to some embodiments, the metric comprises the number of touches recorded within the predetermined time period.

According to some embodiments, the sensor device comprises at least one of a digital camera, heat sensor, bi-spectral camera, CCTV camera, proximity sensor, infra-red sensor or ultrasonic sensor.

Some embodiments further comprise awaiting a notification that cleaning has finished, and terminating the cleaning procedure upon receiving the notification.

Some embodiments further comprise displaying data received from the imaging device on a display, and receiving data from a user indicating an area of the received data that should be associated with the shared surface.

Some embodiments relate to a system for facilitating the cleaning of a shared surface, the system comprising: a sensor device; and a server system in communication with the sensor device, wherein the server system is configured to execute the method of some other embodiments.

Some embodiments further comprise a staff computing device in communication with the server system.

In some embodiments, the server is a cloud based server system.

DESCRIPTION OF THE DRAWINGS

Embodiments are described in further detail below, by way of example and with reference to the accompanying drawings.

DETAILED DESCRIPTION

Embodiments generally relate to methods and systems for facilitating cleaning of a shared environment. Specifically, embodiments relate to methods and systems for tracking use of a shared environment, and facilitating cleaning of the environment based on the tracked use.

Figure 1:
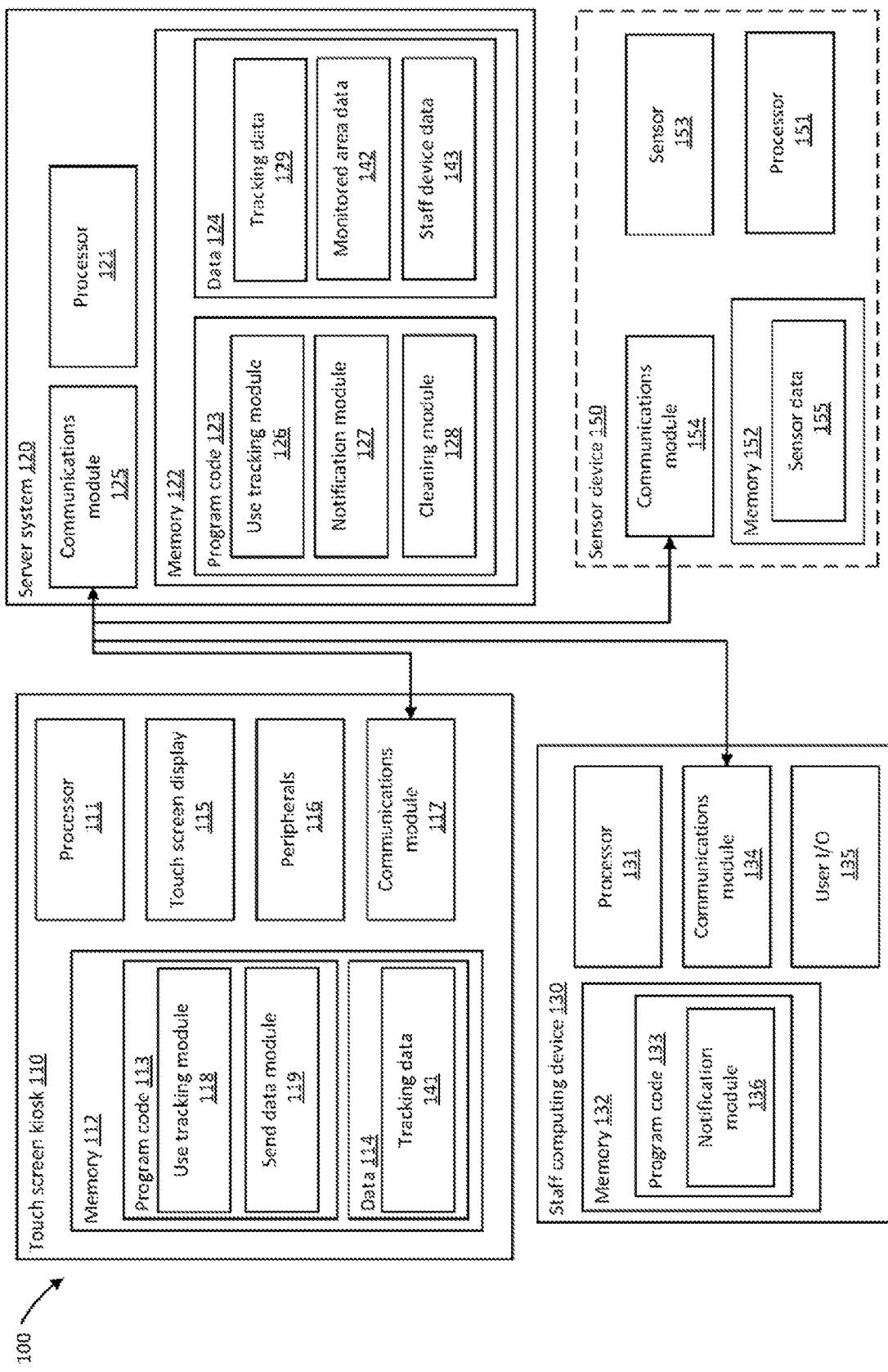
FIG. 1 shows a block diagram of a system for tracking contact with a touch screen display or other shared surface.

FIG. 1 shows a system 100 for tracking contact with a touch screen display or other shared surface, for generating notifications that the touch screen or surface should be cleaned based on the tracking, for prompting and facilitating cleaning, and for monitoring compliance with a prompt to clean the touch screen or surface based on the tracking. System 100 includes a touch screen kiosk 110. System 100 further includes a server system 120. System 100 also includes a staff computing device 130. According to some embodiments, system 100 may also optionally include a sensor device 150.

Touch screen kiosk 110 may be a self-service counter at a supermarket, a self-check-in kiosk at an airport, an ATM, or another self-service touch screen kiosk. Touch screen kiosk 110 is configured to communicate with a server system 120, which may comprise one or more computing devices. According to some embodiments, server system 120 may comprise a cloud based server system. Server system 120 is also configured to communicate with a staff computing device 130 and optionally with a sensor device 150. Staff computing device 130 may be external to touch screen kiosk 110. Staff computing device 130 may comprise a smart phone, tablet, PDA, laptop or desktop computer, or other computing device. Staff computing device 130 may be operated by a staff member, owner, or maintenance personnel associated with touch screen kiosk 110. Sensor 150 may be a camera or other sensor device configured to track use of shared public environments, and particularly shared surfaces, as described below with reference to FIGS. 6 to 10.

While system 100 is illustrated showing a single touch screen kiosk 110, a single staff computing device 130 and a single sensor device 150, server system 120 may communicate with a plurality of touch screen kiosks 110, a plurality of staff computing devices 130 and/or a plurality of sensor devices 150. According to some embodiments, each staff computing device 130 may be associated with one or more touch screen kiosks 110 and/or sensor devices 150. In some embodiments, each touch screen kiosk 110 and each sensor device 150 may be associated with one or more staff computing devices 130.

Touch screen kiosk 110 comprises a processor 111 configured to read from and write to a memory 112. Processor 111 may include one or more data processors for executing instructions, and may include one or more of a central processing unit, microprocessor, microcontroller-based platform, a suitable integrated circuit, and one or more application-specific integrated circuits (ASIC's).

Memory 112 may include one or more memory storage locations, and may be in the form of ROM, RAM, flash or other memory types. Memory 112 is arranged to be accessible to processor 111, and contain program code 113 that is executable by processor 111, in the form of executable code modules. For example, program code 113 may include a use tracking module 118, and a send data module 119. When executed by processor 111, use tracking module 118 may be configured to track metrics relating to the use of touch screen kiosk 110. When executed by processor 111, send data module 119 may be configured to send data stored in tracking data 141 to server system 120. Memory 112 further stores data 114 that can be read and written to by processor 111. Data 114 may include tracking data 141, which may be configured to store data generated by use tracking module 118.

Touch screen kiosk 110 further comprises a touch screen display 115, which may be a glass-covered touch-sensitive display in some embodiments. Touch screen display 115 may be configured to receive user input by way of touches, contact or pressure on the surface of the display, which may be delivered by the user's hand or finger, a stylus, a cleaning cloth, or another device in some embodiments. When a touch is registered by touch screen display 115, touch screen display 115 may generate data relating to the touch event and store the data to memory 112 in tracking data 141. For example, in some embodiments, data relating to an x-coordinate and a y-coordinate corresponding to the area of touch screen display 115 on which the touch occurred may be generated and stored. Where a user moves their hand or finger across the surface of display 115, x and y-coordinates describing the movement path may be generated and stored. According to some embodiments, a time stamp may be generated based on the time at which the touch event occurred, and stored in tracking data 141. The timestamp may include one or more of a year, month, date and time. A touch type may also be generated and stored for each touch event. For example, according to some embodiments, the touch type may be determined to be at least one of a mouse down, mouse up, touch start, touch end, touch move, touch cancel, or context menu touch event. Other data, such as an identification number relating to the touch screen display 115, an application identification number for any applications running on display 115, and an application version identification number, may also be generated and stored.

The touch data may be processed and stored to tracking data 141 by processor 111 executing use tracking module 118. According to some embodiments, processor 111 may also use the touch data to derive one or more use metrics, such as the start of a user session at kiosk 110, the end of a user session at kiosk 110, or kiosk 110 becoming idle. Tracking data 141 and any use metrics may then be sent to server system 120 for storage as tracking data 129. According to some embodiments, data may be sent to server system 120 periodically in batches. In some embodiments, the data may be sent every five minutes, for example. Once data has been sent to server system 120, it may be marked as sent within tracking data 141 by processor 111. In some embodiments, sent data may be deleted from memory 112. According to some embodiments, processor 111 may be configured to periodically delete data that has been marked as sent. In some alternative embodiments, data may be sent to server system 120 in real time.

Touch screen display 115 may further be configured to display data based on instructions received from processor 111. The data may comprise user-interactive screens including images, text, and virtual buttons, for example.

Touch screen kiosk 110 further comprises other peripherals 116, which may include a credit card payment terminal, RFID card writer, or receipt printer, for example. Peripherals 116 may include user input peripherals, as well as user output peripherals. According to some embodiments, when a signal relating to a use event is communicated to or received from a peripheral 116, processor 111 may generate data relating to the use event and store the data to memory 112 in tracking data 141. For example, where peripherals 116 include a credit card payment terminal, data relating to a user swiping a credit card or using a PIN pad to enter a PIN may be generated and stored by processor 111. Where peripherals 116 include a receipt printer, data relating to a receipt being printed may be generated and stored. The data may include a time stamp generated based on the time at which the use event occurred.

Touch screen kiosk 110 also comprises a communications module 117. Communications module 117 may be configured to facilitate communication between touch screen kiosk 110 and remote computing devices via a wired or wireless communication protocol, such as Ethernet, USB, Wi-Fi or Bluetooth, for example. For example, communications module 117 may facilitate communication between touch screen kiosk 110 and server system 120.

Server system 120 comprises a processor 121 configured to read from and write to a memory 122. Processor 121 may include one or more data processors for executing instructions, and may include one or more of a central processing unit, microprocessor, microcontroller-based platform, a suitable integrated circuit, and one or more application-specific integrated circuits (ASIC's).

Memory 122 may include one or more memory storage locations, and may be in the form of ROM, RAM, flash or other memory types. Memory 122 is arranged to be accessible to processor 121, and contain program code 123 that is executable by processor 121, in the form of executable code modules. For example, program code 123 may include a use tracking module 126, a notification module 127, and a cleaning module 128. When executed by processor 121, use tracking module 126 may be configured to track metrics relating to the use of touch screen kiosk 110 and/or other shared environments. For example, processor 121 may be configured to derive one or more use metrics, such as the start of a user session at kiosk 110, the end of a user session at kiosk 110, or kiosk 110 becoming idle, based on data received by server system 120. When executed by processor 121, notification module 126 may be configured to generate and send notifications relating to the use of touch screen kiosk 110 and/or other shared environments to prompt a cleaning program to be initiated. When executed by processor 121, cleaning module 128 may be configured to facilitate the cleaning of touch screen kiosk 110 and/or other monitored shared environments.

Memory 122 further stores data 124 that can be read and written to by processor 121. Data 124 may include tracking data 129, which may be configured to store data generated by use tracking module 126. Data 124 may further include monitored area data 142 and staff device data 143, which may be configured to store data relating to one or more touch screen kiosks 110 or other monitored environments and one or more staff computing devices 130, respectively. For example, monitored area data 142 may store an identification number, a location, and details of at least one associated staff computing device 130 for each touch screen kiosk 110 and for each sensor device 150 associated with a shared environment to be monitored. Staff device data 143 may store contact details such as a telephone number or email address, and details of at least one associated touch screen kiosk 110 and/or sensor device 150 for each staff computing device 130.

Server system 120 also comprises a communications module 125. Communications module 125 may be configured to facilitate communication between server system 120 and remote computing devices via a wired or wireless communication protocol, such as Ethernet, USB, Wi-Fi or Bluetooth, for example. For example, communications module 125 may facilitate communication between server system 120 and touch screen kiosk 110, between server system 120 and staff computing device 130, and optionally between server system 120 and sensor device 150.

Staff computing device 130 comprises a processor 131 configured to read from and write to a memory 132. Processor 131 may include one or more data processors for executing instructions, and may include one or more of a central processing unit, microprocessor, microcontroller-based platform, a suitable integrated circuit, and one or more application-specific integrated circuits (ASIC's).

Memory 132 may include one or more memory storage locations, and may be in the form of ROM, RAM, flash or other memory types. Memory 132 is arranged to be accessible to processor 131, and contain program code 133 that is executable by processor 131, in the form of executable code modules. For example, program code 133 may include a notification module 136. When executed by processor 131, notification module 136 may be configured to receive notifications sent from server system 120, and to display these to a user of staff computing device 130. According to some embodiments, notification module 136 may form part of a messaging application, such as an SMS or email application. According to some embodiments, notification module 136 may for part of a web browser that causes the messages to be displayed via a web page. According to some embodiments, notification module 136 may form part of a resident application installed on staff device 130 and specifically designed for communication of messages relating to touch screen kiosk 110.

Staff computing device 130 also comprises a communications module 134. Communications module 134 may be configured to facilitate communication between staff computing device 130 and remote computing devices via a wired or wireless communication protocol, such as Ethernet, USB, Wi-Fi or Bluetooth, for example. For example, communications module 134 may facilitate communication between staff computing device 130 and server system 120.

Staff computing device 130 further comprises user input/output 135. User I/O 135 may comprise one or more of a display screen, a touch screen display, buttons, cameras, microphones, speakers, keyboards, mice, or other peripherals that allow a user to communicate with staff computing device 130.

Sensor system 100 may optionally comprise a sensor device 150 for tracking contact with surfaces other than touch screen display 115. Sensor device 150 comprises a processor 151 configured to read from and write to a memory 152. Processor 151 may include one or more data processors for executing instructions, and may include one or more of a central processing unit, microprocessor, microcontroller-based platform, a suitable integrated circuit, and one or more application-specific integrated circuits (ASIC's).

Memory 152 may include one or more memory storage locations, and may be in the form of ROM, RAM, flash or other memory types. Memory 152 is arranged to be accessible to processor 151, and to store sensor data 155 that can be read and written to by processor 151. Sensor data 155 may be configured to store data generated by sensor 153.

Sensor device 153 may comprise an imaging device in some embodiments. Sensor device 153 may comprise a digital camera, heat sensor, bi-spectral camera, CCTV camera, proximity sensor, infra-red sensor, ultrasonic sensor, or other sensor that can detect the presence of individuals and determine proximity and/or contact between individuals and shared surfaces in a public environment, such as floor surfaces, table surfaces and chair surfaces, for example. Sensor 153 may generate sensor data that is processed and stored by processor 151 in sensor data 155. Sensor data 155 may then be periodically communicated to server system 120 via communications module 154. For example, the data may be sent to server system 120 every five minutes in some embodiments. In some alternative embodiments, the data may be sent to server system 120 in real time.

Communications module 154 may be configured to facilitate communication between sensor device 150 and remote computing devices via a wired or wireless communication protocol, such as Ethernet, USB, Wi-Fi or Bluetooth, for example. For example, communications module 154 may facilitate communication between sensor device 150 and server system 120. According to some embodiments, communications module 154 may facilitate communication between sensor device 150 and server system 120 indirectly, such as by facilitating communication between sensor device 150 and kiosk 110 or another device which may subsequently communicate the data to server system 120.

Figure 2:
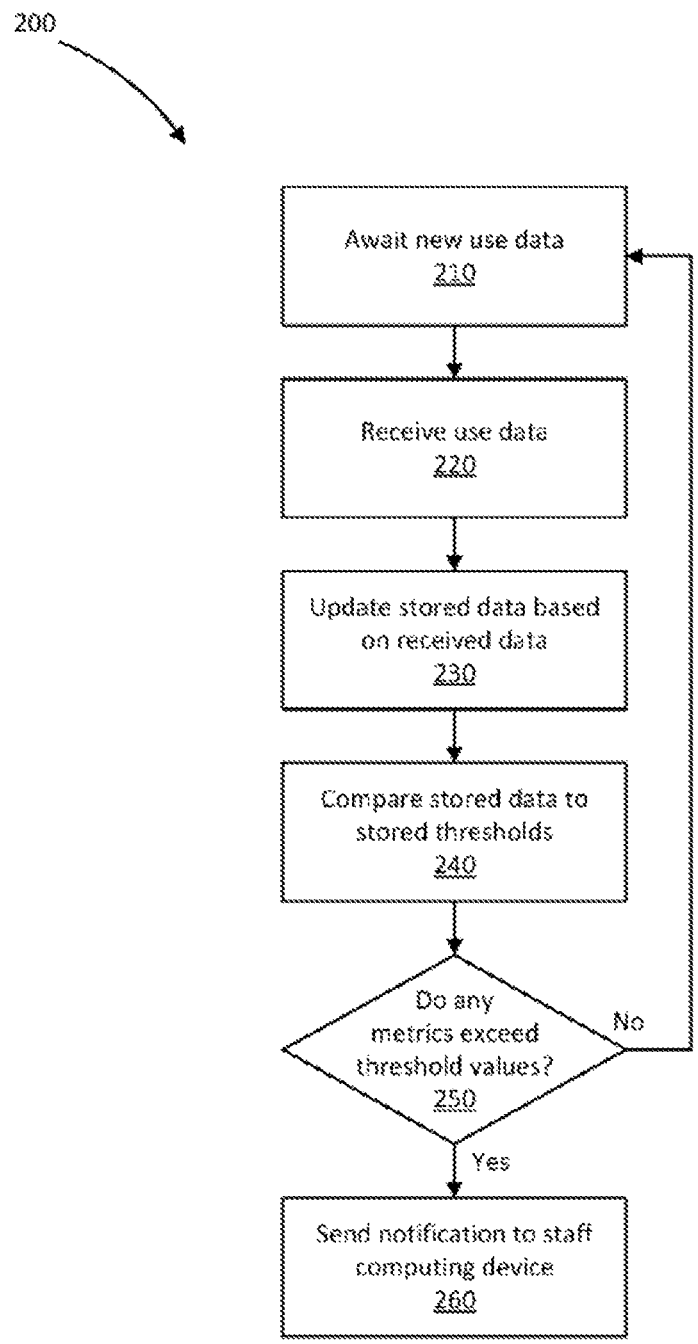
FIG. 2 shows a flowchart illustrating a method of generating a notification that a cleaning process should be initiated using the system of FIG. 1.

FIG. 2 shows a flowchart of a method 200 executed by system 100 to track the use of touch screen kiosk 110. While certain steps of method 200 are described below as being executed by one of touch screen kiosk 110 or server system 120, it should be appreciated that these steps may be executed by either one or a combination of these devices.

Method 200 starts at step 210, with server system 120 awaiting new use data to be received from touch screen kiosk 110. Processor 111 of touch screen kiosk 110 may be configured to execute send data module 119 to send tracking data 141 to server system 120 periodically based on a predetermined time period elapsing, or based on a predefined event, such as when a touch event is generated by touch screen display 115 based on a touch being detected. When a touch is detected by touch screen display 115, processor 111 of touch screen kiosk 110 may be configured to execute use tracking module 118, and to write touch data to tracking data 141. Touch data may include the location and time that the touch event occurred, and whether the touch was determined by processor 111 to be a first touch event in a new interaction session with touch screen kiosk 110 or a last touch event in a current interaction session with touch screen kiosk 110. Processor 111 may also store data relating to an idle status of touch screen kiosk 110, such as when kiosk 110 became idle due to no user interaction. Other data, such as a device identification number, display identification number and application identification number relating to kiosk 110 may also be recorded.

When processor 111 determines that the predetermined time period has elapsed or that the predefined event has occurred, processor 111 executes send data module 119, which causes processor 111 to retrieve stored use data from tracking data 141, and to send the data to server system 120 via communications module 117.

At step 220, server system 120 receives the use data via communications module 125.

At step 230, processor 121 is caused to execute use tracking module 126 to update the data stored in tracking data 129 associated with the touch screen kiosk 110 from which the data was received. Data stored in tracking data 129 may relate to one or more use metrics, such as a number of touches recorded over a predetermined time period, a number of use sessions recorded over a predetermined time period, the duration of the use sessions recorded over the predetermined time period, the number of transactions carried out over the predetermined time period, the number of tasks completed during the predetermined time period, or the duration for which touch screen kiosk 110 was idle during the predetermined time period.

At step 240, still executing tracking module 126, processor 121 is caused to compare the tracking data stored in tracking data 129 to one or more stored threshold metrics. The stored metrics may each be configured with a default or user-defined threshold. A user may be able to modify the threshold by accessing a user portal hosted on server system 120 via staff device 130 acting as an administration console. The thresholds may relate to a number of touches, a number of use sessions, the duration of the use sessions, or the duration of idle time, for example.

At step 250, still executing tracking module 126, processor 121 determines whether any of the stored use data exceeds a corresponding threshold. If none of the stored data exceeds the threshold, processor 121 stops executing use tracking module 126, and method 200 returns to step 210, awaiting further data to be received.

According to some embodiments, tracking data 129 may store more than one threshold value for each monitored metric. According to some embodiments, a first threshold and a second threshold may be stored, where the first threshold is lower than the second threshold. The first threshold may be a notification or warning threshold, while the second threshold may be a prompt threshold. If processor 121 determines that at least one stored metric exceeds the first threshold but not the second threshold, processor 121 may be configured to send a warning notification to an associated staff computing device 130 to notify them that a cleaning action will soon be required. The notification may be informative only, and may not be designed to prompt any action.

If processor 121 determines that data relating to at least one metric does exceed an associated stored threshold which is a second threshold or prompt threshold, then processor 121 begins to execute notification module 127 at step 260.

Processor 121 executing notification module 127 first retrieves kiosk data 142 relating to the touch screen kiosk 110 for which the data has exceeded the threshold, to determine which one or more staff computing devices 130 are associated with the touch screen kiosk 110. Processor 111 still executing notification module 127 then retrieves contact information from staff device data 143 relating to the associated staff computing devices 130. At step 260, processor 121 then sends a notification to the staff computing devices 130 to notify them that a threshold has been exceeded and that a cleaning action should be taken. The notification may include an email, SMS text message, API call-back, instant message or a chat notification, in some embodiments. An example notification is described below in further detail with reference to FIG. 5A. According to some embodiments the notification message may be logged in an events logging analytics service, which may be hosted on server system 120. The notification may be processed by notification module 136 of staff computing device 130.

As described below with reference to FIGS. 5A and 5B, the notification may include an identification number and a location of the kiosk 110, as retrieved from kiosk data 142. The text and data sent in the notification messages may be configurable by a user. The notification message may also include an instruction to the user of staff computing device 130 to notify server system 120 once a cleaning program has been initiated. This may be done by staff computing device 130 sending a reply message back to server system 120, for example. The method performed by server system 120 upon being notified that a cleaning program has been initiated is described below with reference to FIG. 3.

According to some embodiments, during step 260 processor 121 may also be configured to disable kiosk 110 to avoid further contact, and to cause display 115 to display a message to users indicating that the kiosk is out of order, as described below with reference to FIG. 12A.

Figure 3:
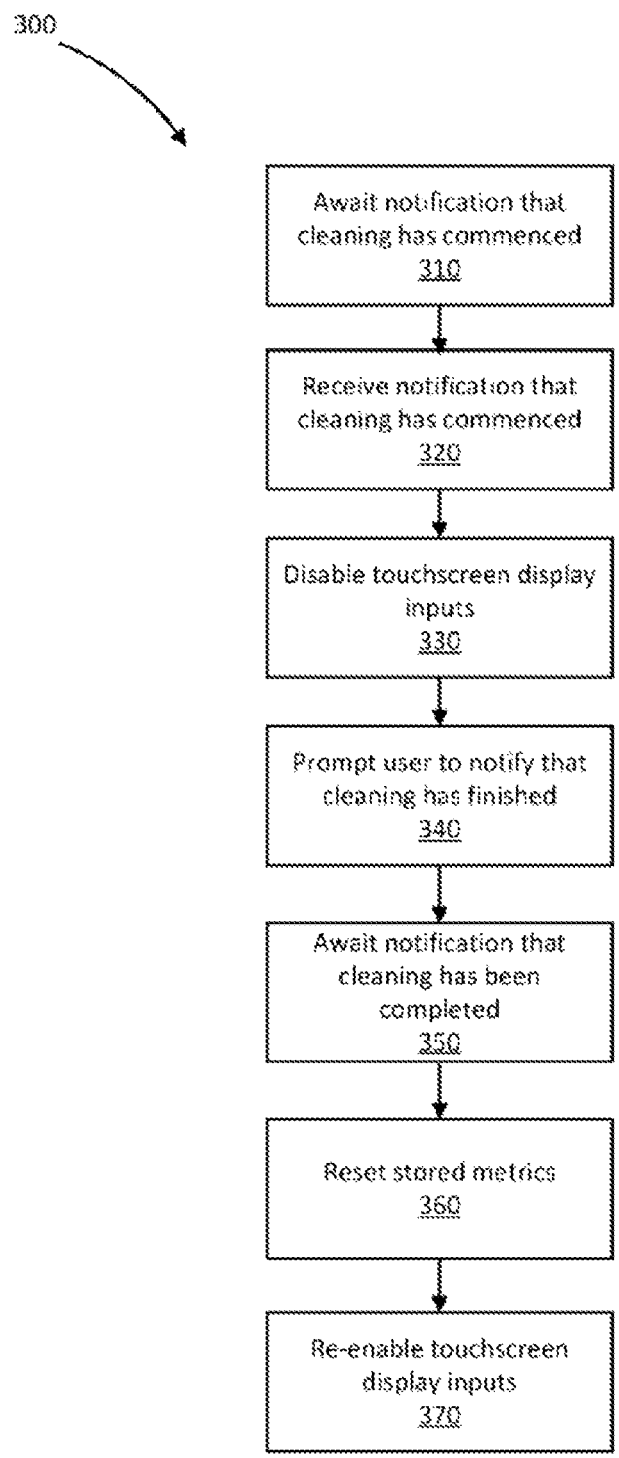
FIG. 3 shows a flowchart illustrating a method of performing a cleaning process using the system of FIG. 1.

FIG. 3 shows a flowchart of a method 300 executed by system 100 to facilitate the cleaning of touch screen kiosk 110. While certain steps of method 200 are described below as being executed by one of touch screen kiosk 110, server system 120, or staff computing device 130, it should be appreciated that these steps may be executed by any one or a combination of these devices.

Method 300 starts at step 310, with server system 120 awaiting a notification to be received that cleaning of touch screen kiosk 110 has commenced. According to some embodiments, processor 133 executing notification module 136 may cause staff computing device 130 to send such a notification to server system 120 via communications module 134. The message may be sent in response to a user of staff computing device 130 replying to the notification received from server system 120 as described above with reference to step 260 of method 200 and as described below with reference to FIG. 5A, or by otherwise interacting with user I/O 135 to cause a notification to be sent. According to some alternative embodiments, the notification may be sent from touch screen kiosk 110 to server system 120, based on a user of staff computing device 130 interacting with touch screen display 115 to indicate that a cleaning program is to be commenced, based on an instruction received on staff computing device 130. According to some embodiments, where a notification is sent by server system 120 as described above with reference to step 260 of method 200 but no reply is received from staff computing device 130 or kiosk 110 within a predetermined time period, an escalation process may be initiated, as described below with reference to FIG. 14.

At step 320, server system 120 receives a notification via communications module 125 that cleaning has commenced. In response to receiving and processing the notification, processor 121 is caused to execute cleaning module 128.

At step 330, processor 121 executing cleaning module 128 sends an instruction via communications module 125 to touch screen kiosk 110 to cause touch screen display 115 to disable any touch inputs. This avoids any cleaning motion using a cloth and solution on touch screen display 115 from inadvertently triggering an input. The instruction may further cause touch screen display 115 to display cleaning data, as described below in further detail with respect to FIG. 11. The cleaning data may include information about which parts of touch screen kiosk 110 need cleaning, and how touch screen display 110 should be cleaned. For example, according to some embodiments, the most activated areas of the touch screen display 115 may be highlighted, allowing those areas to be focused on during the cleaning process, as shown in FIGS. 12A to 13.

Figure 12B:
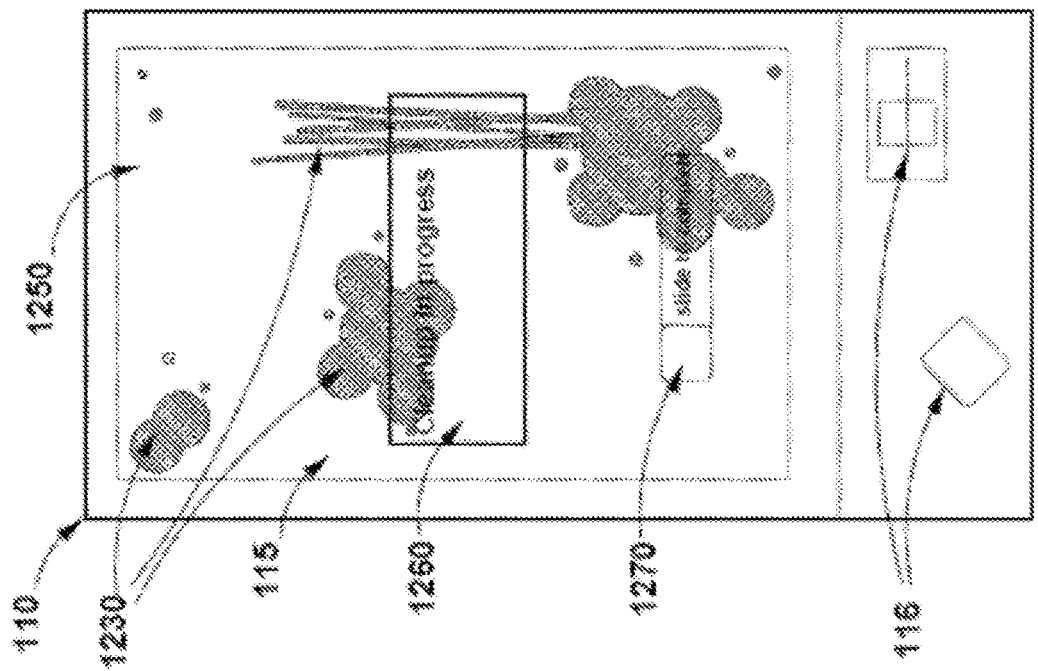
FIGS. 12A and 12B show alternative example screenshots displayed by the kiosk of FIG. 1 during cleaning.

At step 340, processor 121 still executing cleaning module 128 sends a notification via communications module 125 to staff computing device 130 to notify a user that cleaning can commence, and to prompt the user to notify server system 120 when cleaning has been completed. For example, the notification may read "Proactive Maintenance. Cleaning mode is being enabled on device NL1456. Please clean device as instructed." Processor 131 of staff computing device 130 executes notification module 136 to display the notification to the user, and await feedback from the user that indicates that cleaning has finished. Once a user finishes cleaning by following the instructions displayed on touch screen display 115, the user may indicate that cleaning has finished by interacting with user I/O 135 or with a selected un-disabled area on display 115, as shown in FIG. 12B. Processor 131 may receive the user input, and cause a notification to be sent to server system 120 via communications module 134.

At step 350, server system 120 receives the notification that cleaning has finished via communications module 125. Alternatively, according to some embodiments, processor 121 of server system 120 may determine that cleaning has finished based on data received from touch screen display 115 or sensor device 150. For example, touch screen display 115 may track the cleaning process, and processor 121 may determine that cleaning has finished when all contacted areas of display 115 have been cleaned, as described below with reference to FIG. 13.

In response, at step 360, processor 121 still executing cleaning module 128 resets the metrics stored for the touch screen kiosk 110 that the notification relates to. Specifically, processor 121 may set the metrics relating to number of touches, number of use sessions, the duration of the use sessions, and the duration of idle time to zero.

At step 370, processor 121 still executing cleaning module 128 sends an instruction via communications module 125 to touch screen kiosk 110 to cause touch screen display 115 to re-enable the touch inputs. The instruction may further cause touch screen display 115 to display its usual screen display, rather than the previously displayed cleaning data. According to some embodiments, touch screen display 115 may further be caused to display a message showing a time since last cleaning. Processor 121 may then stop executing cleaning module 128, and return the beginning of method 200, awaiting further use data.

Figure 4:
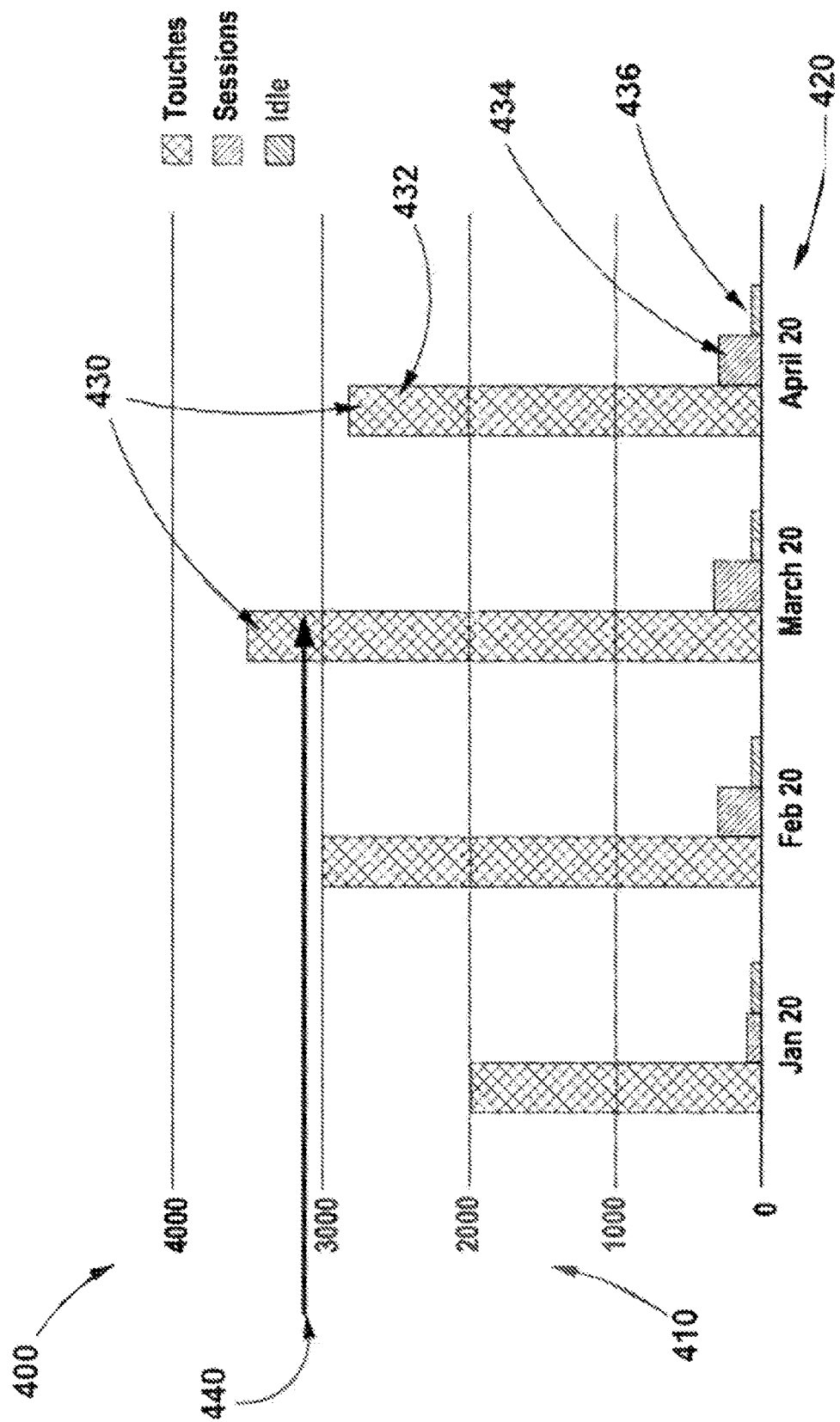
FIG. 4 shows a graph showing tracking as performed by the system of FIG. 1.

FIG. 4 shows an example graph 400 showing example use metrics 430 and an example threshold value 440 for a use metric that may be stored in tracking data 129 of memory 122 on server system 120.

X-axis 420 of graph 400 shows the time periods over which the metrics 430 are tracked in months, while y-axis 410 shows the number of occurrences of each metric 430. Metrics 430 include a number of touches 432, a number of sessions 434, and a number of time periods of idleness 436. Illustrated threshold 440 is a threshold relating to the number of touches metric 432, and metrics 434 and 436 may have their own distinct thresholds.

As shown by graph 400, metric 432 did not exceed threshold 440 in January or February. However, threshold 440 was exceeded by metric 432 in March. When threshold 440 is exceeded, system 100 would be caused to perform methods 200 and 300 as described above with reference to FIGS. 2 and 3.

Figure 5B:
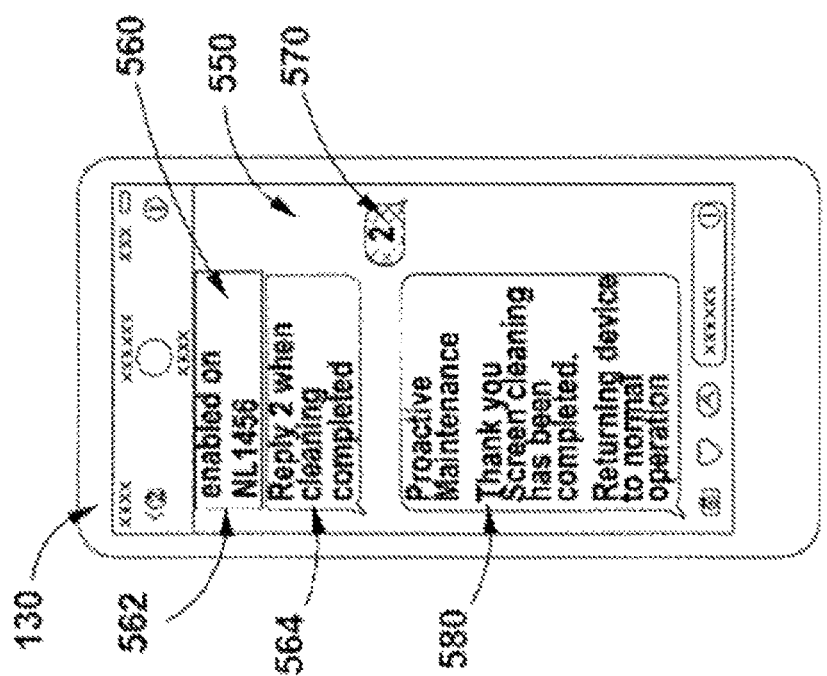
FIGS. 5A and 5B show example screenshots of an application generated by the system of FIG. 1 for facilitating cleaning of a touch screen display.
Figure 5A:
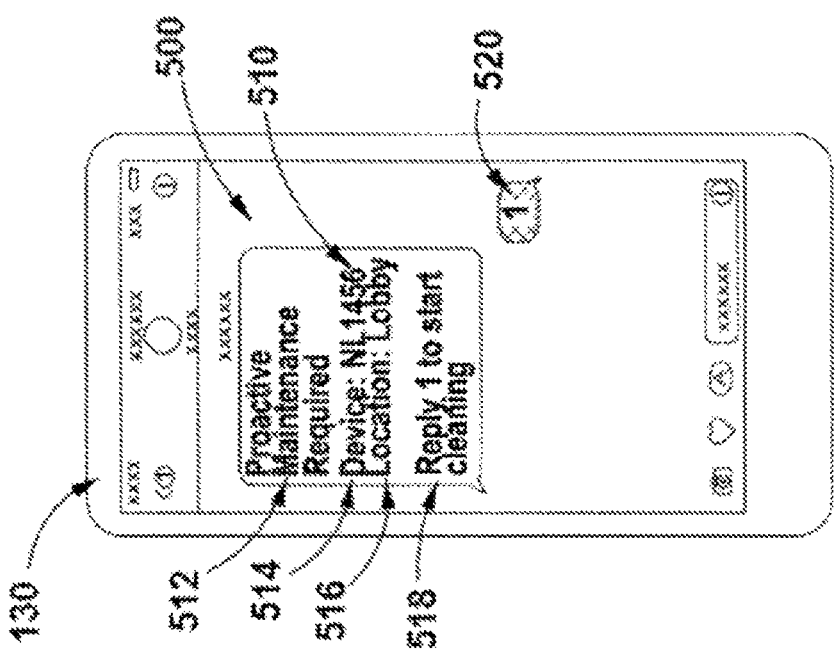

FIGS. 5A and 5B show example screenshots 500 and 550 as shown on a staff computing device 130 when processor 131 is executing notification module 136. Screenshot 500 shows a first notification 510 in the form of a message. Notification 510 may be the notification sent by server system 120 executing step 260 of method 200, as described above with reference to FIG. 2. While particular text is shown as making up notification 510, the text of any notifications generated by server system 120 may be configurable by a user operating a staff device 130 acting as an administration console.

Notification 510 includes an alert 512, being "Proactive maintenance required". Notification 510 further includes identifiers relating to a touch screen kiosk to which the notification relates, including an identification number 514 and location 516. In the illustrated example, identification number 514 is NL1456, and the location is the lobby. Notification 510 also includes a prompt 518, prompting the user to "Reply 1 to start cleaning". In the illustrated embodiment, the user of device 130 has responded to the prompt with message 520, which contains the response "1", indicating that the user would like to begin the cleaning process. As described above with reference to FIG. 3, server system 120 receiving message 520 would cause a cleaning or maintenance method to commence. As described below with reference to FIG. 14, if no response is received, an escalation process may be initiated.

Screenshot 550 shows a third notification 560. Notification 560 may be a notification sent by server system 120 executing step 340 of method 200, as described above with reference to FIG. 2. Specifically, notification 560 includes a confirmation message 562 stating that the cleaning program was enabled on touch screen kiosk 110. Notification 560 further includes a prompt 564, asking the user to "Reply 2 when cleaning is complete". In the illustrated embodiment, the user of device 130 has replied with notification 570, which contains the response "2". As described above with reference to step 350 of method 300, server system 120 may receive notification 570 and determine that cleaning has been completed. Server system 120 may respond with a further message 580 at step 370, which confirms that touch screen kiosk 110 is being returned to its normal operation.

Figure 11:
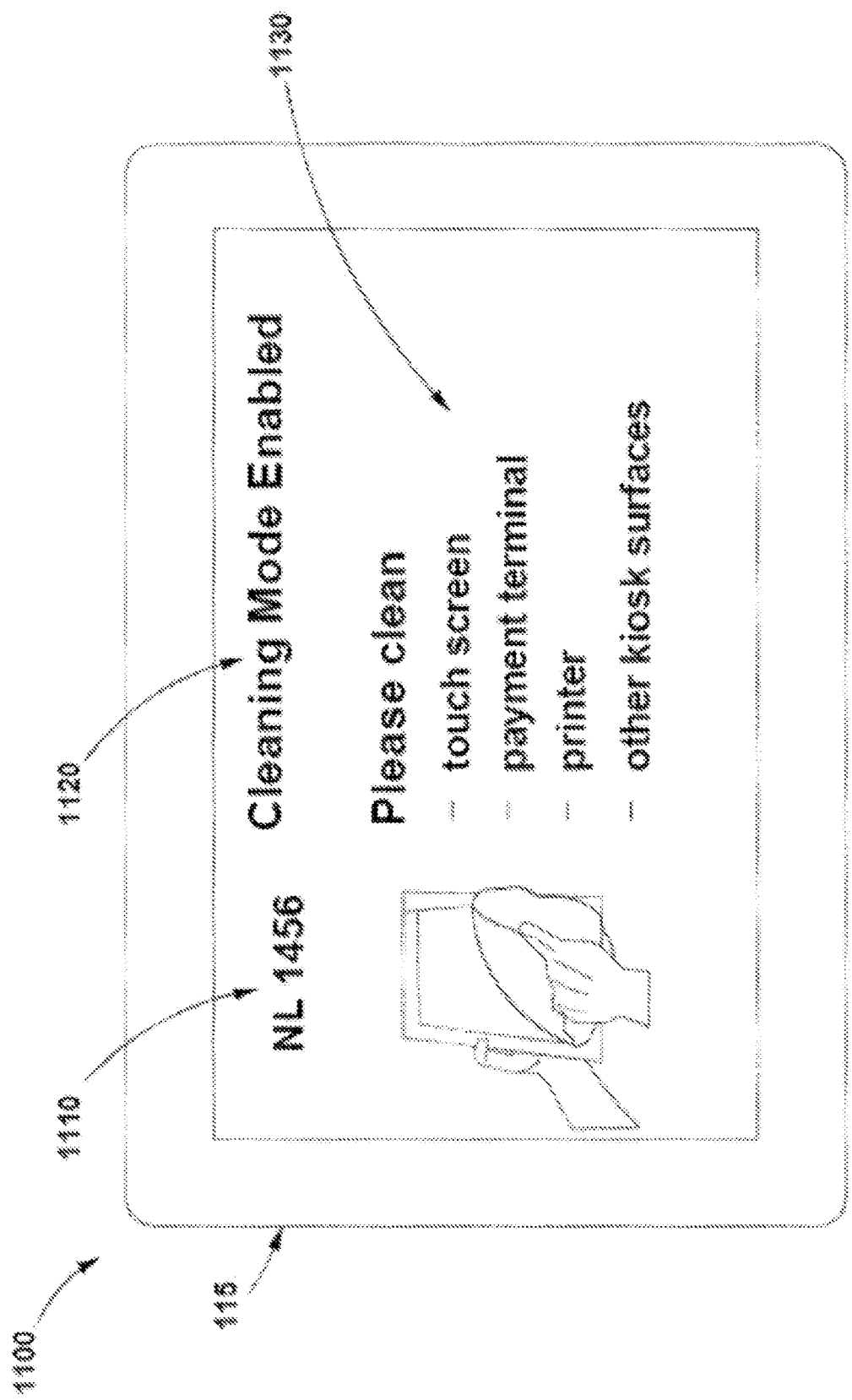
FIG. 11 shows an example screenshot displayed by the kiosk of FIG. 1 during cleaning.

FIG. 11 shows an example screenshot 1100 that may be displayed by the touchscreen display 115 and/or by staff device 130 during step 330 of method 300. Screenshot 1100 may display a device identification number 1110, and a message 1120 notifying a user that cleaning mode has been enabled. A list 1130 of areas to be cleaned is also displayed. In the illustrated embodiment, list 1130 instructs the user to clean the touch screen, the payment terminal, the printer and other kiosk surfaces of the identified kiosk 110.

Figure 12A:
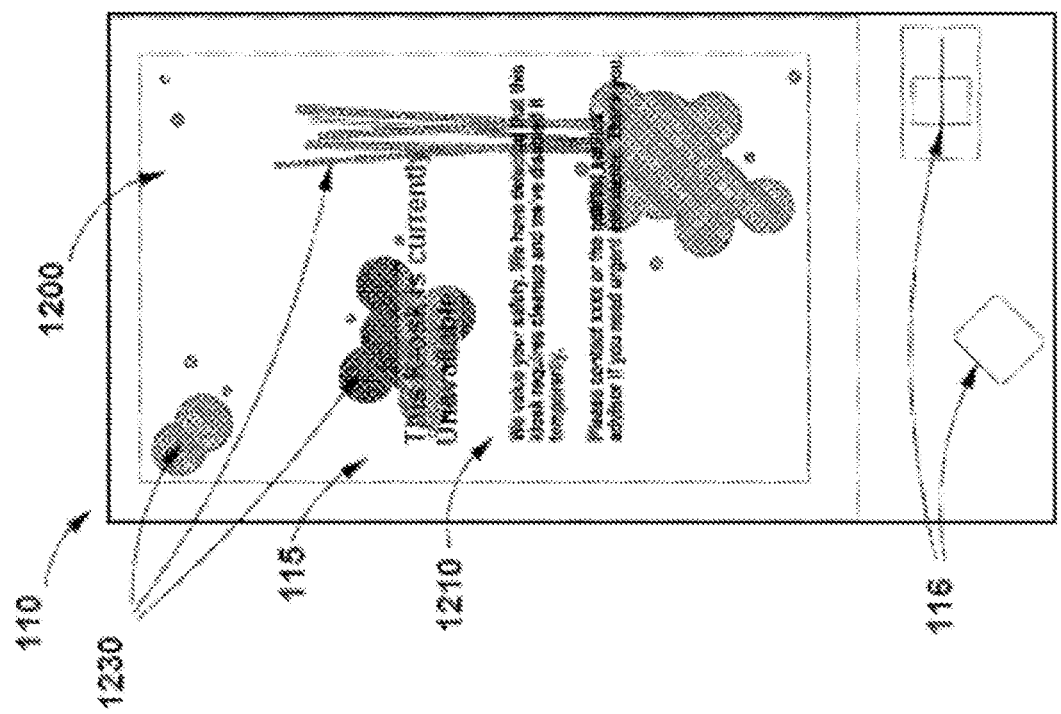

FIGS. 12A and 12B show kiosk 110 displaying alternative screenshots 1200 and 1250 on touchscreen display 115 prior and during cleaning of kiosk 110. Illustrated kiosk 110 also includes peripherals 116. FIG. 12A shows screenshot 1200, which may be displayed by kiosk 110 once a cleaning threshold has been reached as described above with reference to step 260 of method 200, but before cleaning has been performed. Screenshot 1200 displays a message 1210, indicating that the kiosk is currently unavailable, and listing a contact number that can be used to reach a service advisor for assistance. Screenshot 1200 also includes contact indication markings 1230, which highlight areas of display 115 that have been touched since the last clean occurred, as detected by display 115 during use. According to some embodiments, markings 1230 may indicate a number or duration of touches to a particular area, based on the size, shape or colour of markings 1230. Markings 1230 may be displayed in at least one location of display 115 corresponding to location data or coordinate data recorded by display 115 during a touch event.

FIG. 12B shows screenshot 1250, which may be displayed by kiosk 110 once cleaning has commenced at step 330 of method 300. Screenshot 1250 displays a message 1260 indicating that cleaning is in progress. Screenshot 1250 also displays a slider 1270 that a user can interact with once cleaning has been completed. As with screenshot 1200, screenshot 1250 also displays contact indication markings 1230, which highlight areas of display 115 that have been touched since the last clean occurred.

Figure 13B:
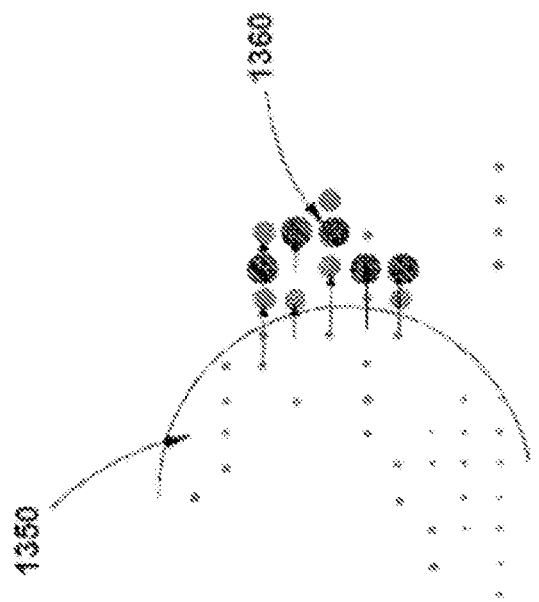
FIG. 13B shows a smudge effect exhibited by the kiosk of FIG. 1.
Figure 13A:
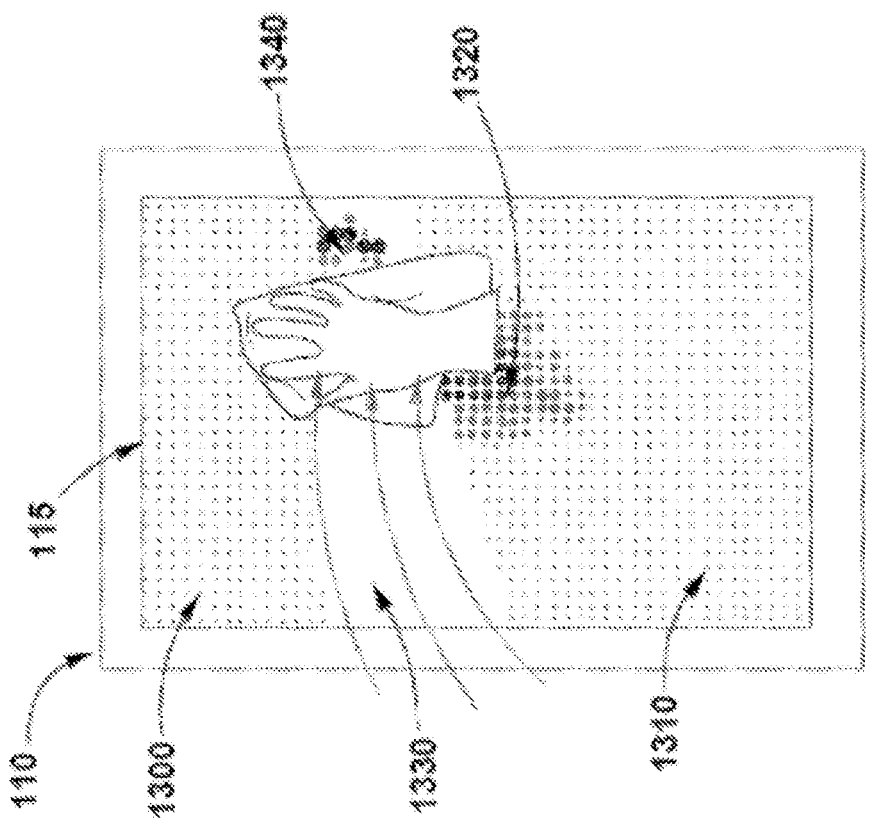
FIG. 13A shows a further example screenshot displayed by the kiosk of FIG. 1 during cleaning.

FIG. 13A shows a further alternative screenshot 1300 that may be displayed by kiosk 110 on display 115 once cleaning has commenced at step 330 of method 300. Screenshot 1300 displays alternative contact indication markings 1310, which highlight areas of display 115 that have been touched since the last clean occurred, as detected by display 115 during use. According to some embodiments, markings 1310 may indicate a number or duration of touches to a particular area, based on the size, shape or color of markings 1310. For example, the illustrated embodiment shows larger markings 1320, which indicate areas of display 115 that have had more contact and are in need of extra cleaning. Markings 1310 may be displayed in at least one location of display 115 corresponding to location data or coordinate data recorded by display 115 during a touch event.

According to some embodiments, rather than disabling input to touchscreen display 115 during cleaning step 330, processor 111 may instead record any touches made to display 115 during step 330 as cleaning touches or cleaning data. Cleaning touches may be recorded in the same way as regular touch events, as described above with reference to FIG. 1. However, processor 111 may interpret these touches as cleaning touches, and these may therefore have the effect of "erasing" previous touch data. Specifically, where a particular pixel or area on display 115 has had a recorded touch event stored in tracking data 141 or tracking data 129, a cleaning touch event may erase, neutralize, or otherwise counteract that touch data for that pixel or area, so that that pixel or area is considered to be free from touches. According to some embodiments, the more touch data has previously been recorded for a particular pixel or area of display 115, the more cleaning touch events need to be recorded to erase the previous touches. This may be reflected on display 115 in real time. For example, as shown by cleaned area 1330, previous markings 1310 have been erased by a cleaning action, meaning this area is now considered to have had no touches since the last cleaning event. This may assist a user in ensuring that the entirety of display 115 has been cleaned, as well as assist in compliance management to ensure that staff are properly cleaning each kiosk 110.

According to some embodiments, processor 111 may also cause display 115 to exhibit a smudge effect. Specifically, as a cleaning touch is performed, touch data may be "smudged" or shifted across display 115, as shown by smudge markings 1340 and displayed in further detail in FIG. 13B.

FIG. 13B shows a smudge effect in action. This effect virtually simulates the way in which dirt, bacteria and other contagions may be smudged of shifted across display 115 during a cleaning action. FIG. 13B shows a touch field 1350 that represents the capacitive touch that may be sensed by display 115 under the rag or hand of a user cleaning display 115. Touch markings that are wiped over by the touch field 110 are shifted in the direction of movement of touch field 1350, as shown by moving markings 1360. As they are moved, these markings may be partially erased by the cleaning touch event, but some of the markings will remain as a "smudge", requiring further cleaning to be performed before they are completely erased.

To cause the smudge effect, cleaning touch events are compared to previously recorded touch event data. If the cleaning touch event corresponds to the previously recorded touch event data, such as by being in the same location as the previously recorded touch event data, processor 111 may modifying the recorded touch event data based on the cleaning touch event. For example, some of the touch event data may be erased, neutralized, or otherwise counteracted as described above. However, in addition to this, processor 111 is also caused to modifying the location data associated with at least some touch event data, causing that data to be 'shifted' as described above. Specifically, processor 111 may cause some of the touch event data associated with the location of the cleaning touch event to be modified to have a new location, the new location being shifted by a predetermined distance in the direction of movement of a touch field associated with the cleaning touch event. For example, the new location may be 1 cm away from the previous location, in the direction of movement of the touch field. Display 115 may be updated to display the modified touch event data, which will have exhibited a smudge effect as described above.

In an alternative embodiment to that described above with reference to FIG. 2, method 200 as illustrated in FIG. 2 may additionally or alternatively be performed in response to data generated by sensor device 150. Specifically, server system 120 may store threshold use data for one or more environments being monitored by sensor device 150, and may cause a notification to be sent to staff computing device 130 when the data generated by sensor device 150 shows that use of the monitored environment or a surface of the monitored environment exceeds a predetermined threshold. In that case, an alternative of method 300 may be performed, as shown in FIG. 8.

Server system 120 may be configured to monitor use, contact or interaction with a shared environment that is monitored by sensor 150. A user may use a staff computing device 130 acting as an administration console to enter information relating to the environment to be tracked. For example, staff computing device 130 may be configured to show an image of the shared environment as captured by sensor 150, allowing a user to set regions to be tracked by tracing those regions on the displayed image, or otherwise using polygons to identify the specific areas to be tracked and monitored for human exposure and interaction. The user may also be able to configure a threshold quantity of times that each surface can be touched or interacted with before cleaning should be performed. According to some embodiments, a user may also be able to configure a threshold distance for each surface, whereby a touch or interaction event is only recorded for that surface if a human is determined to have been within the threshold distance of the surface.

Figure 8:
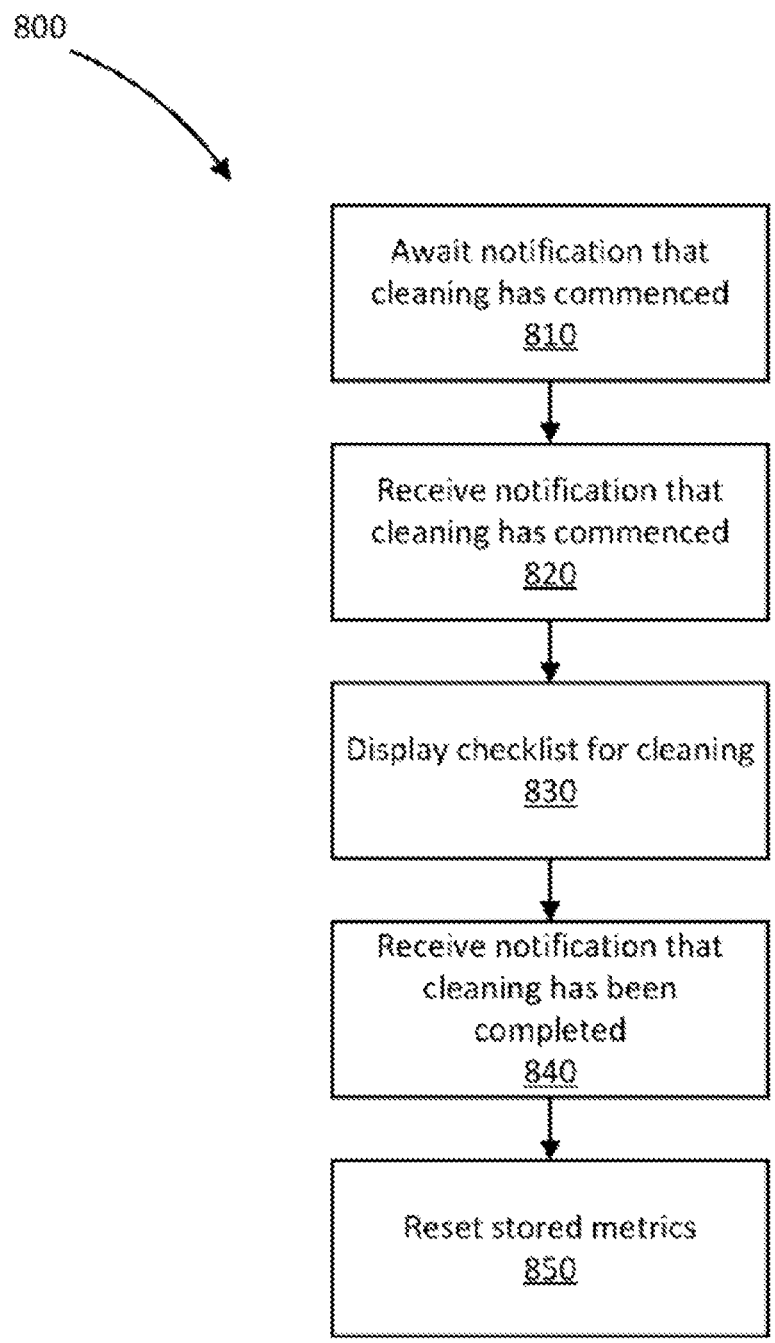
FIG. 8 shows a flowchart illustrating a method of performing a cleaning process of a shared environment using the system of FIG. 1.

FIG. 8 shows a flowchart of a method 800 executed by system 100 to facilitate the cleaning of a shared environment monitored by sensor device 150. While certain steps of method 800 are described below as being executed by one of server system 120, staff computing device 130, or sensor device 150, it should be appreciated that these steps may be executed by any one or a combination of these devices.

Method 800 starts at step 810, with server system 120 awaiting a notification to be received that cleaning of the shared environment has commenced. According to some embodiments, processor 133 executing notification module 136 may cause staff computing device 130 to send such a notification to server system 120 via communications module 134. The message may be sent in response to a user of staff computing device 130 replying to the notification received from server system 120 as described above with reference to step 260 of method 200, or by otherwise interacting with user I/O 135 to cause a notification to be sent At step 820, server system 120 receives a notification via communications module 125 that cleaning has commenced. In response to receiving and processing the notification, processor 121 is caused to execute cleaning module 128.

At step 830, processor 121 executing cleaning module 128 sends data to staff computing device 130 relating to which parts of a monitored environment are to be cleaned. For example, the data may indicate that a countertop, floor or chair surface should be cleaned. According to some embodiments, staff computing device 130 may present the data to the user as a checklist. Processor 131 of staff computing device 130 executes notification module 136 to display the data to the user, and await feedback from the user that indicates that cleaning has finished. For example, processor 131 of staff computing device 130 may determine that cleaning has finished when the user has ticked each item in the checklist, indicating that each surface in the environment that required cleaning has been cleaned. Once a user finishes cleaning each surface, the user may indicate that cleaning has finished by interacting with user I/O 135. Processor 131 may receive the user input, and cause a notification to be sent to server system 120 via communications module 134.

At step 840, server system 120 receives the notification that cleaning has finished via communications module 125.

In response, at step 850, processor 121 still executing cleaning module 128 resets the metrics stored for the monitored environment.

Figure 6:
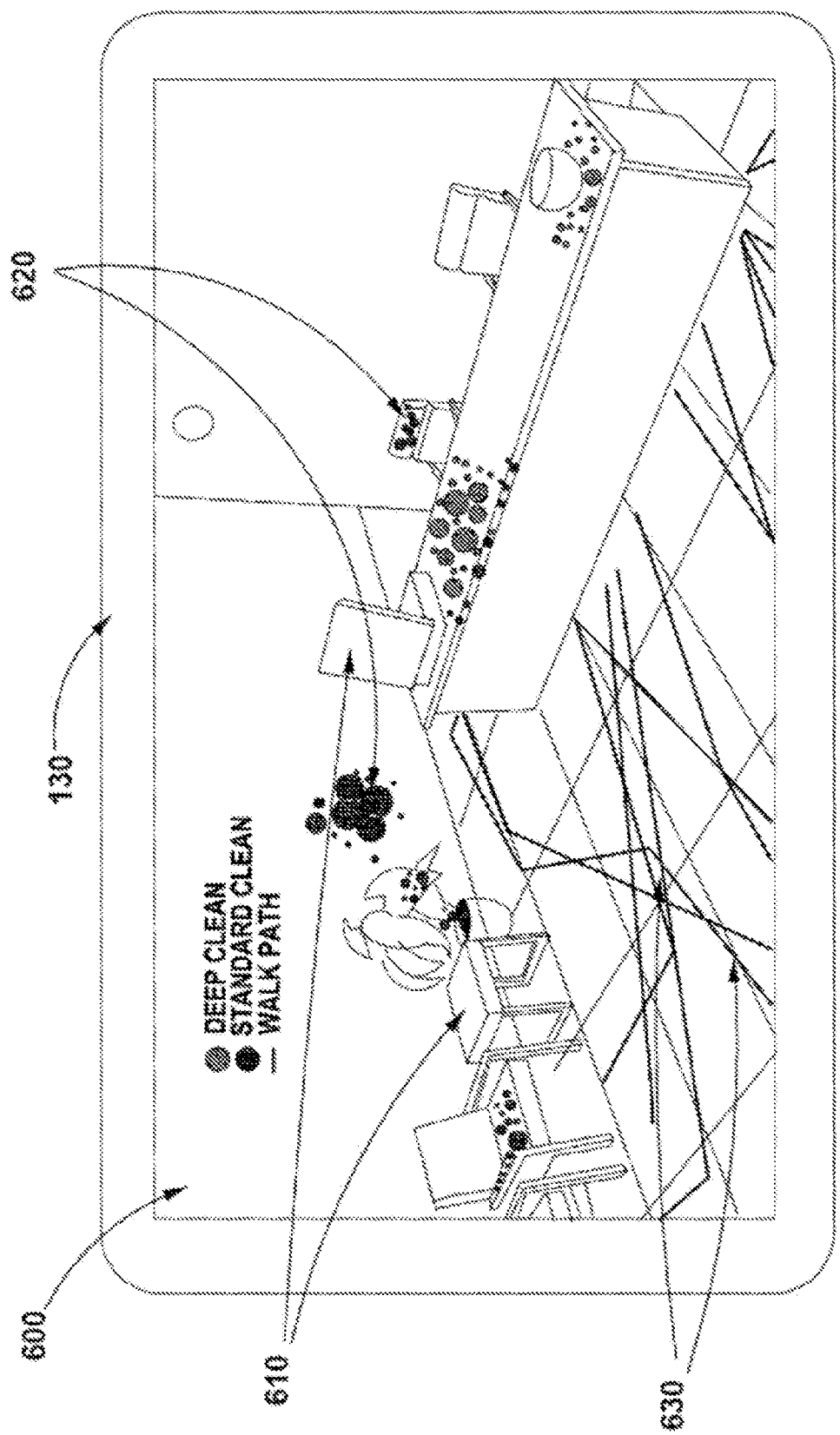
FIGS. 6 and 7 show example screenshots of an application generated by the system of FIG. 1 for facilitating cleaning of other shared surfaces.

FIG. 6 shows an example screenshot 600 that may be shown on a staff computing device 130 during step 830 of method 800, as described above with reference to FIG. 8. Example screenshot 600 shows a monitored environment as captured by sensor device 150, showing areas that have had high use and need a deep clean 610, areas that have had moderate use and require a standard clean 620, as well as walk paths 630 that show foot traffic and indicate areas of the floor that may require cleaning.

Figure 7:
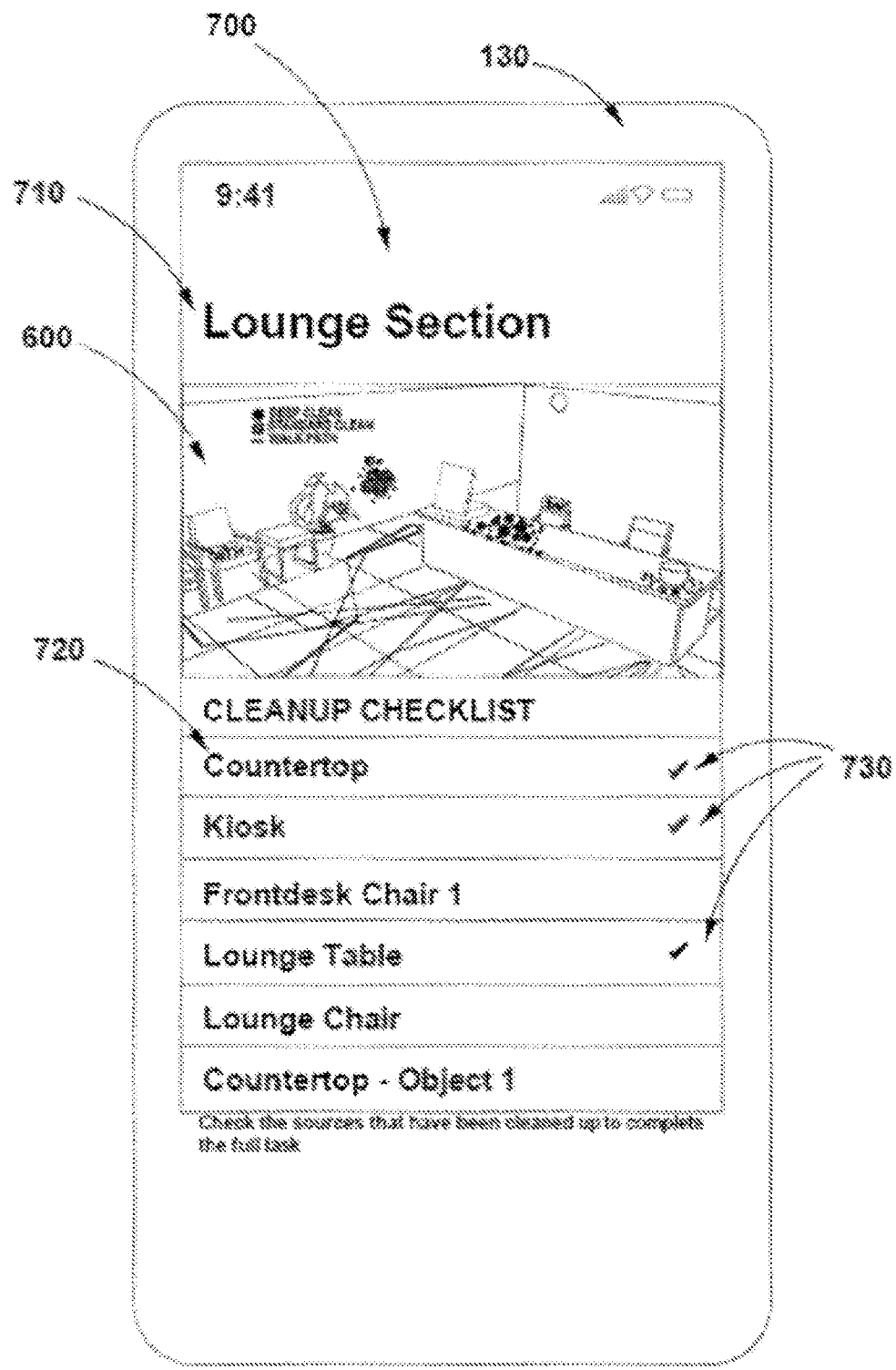

An alternative or additional example screenshot 700 that may be shown on a staff computing device 130 during step 830 of method 800 is shown in FIG. 7. Screenshot 700 may be shown on staff computing device 130 where staff computing device 130 is a mobile phone, for example. Screenshot 700 includes the screenshot 600 as shown in FIG. 6, as well as additional data in the form of a heading 710 indicating the name of the environment being monitored, and a checklist 720 indicating the surfaces that need to be cleaned. For example, illustrated checklist 720 includes surfaces such as the countertop, kiosk, and front desk chair 1. Checks 730 show surfaces that a user of device 130 has marked as having been cleaned. According to some embodiments, once all of the items in checklist 720 have been marked as complete, staff device 130 may send a notification to server system 120, causing server system 120 to proceed with method 800 from step 840.

Figure 9:
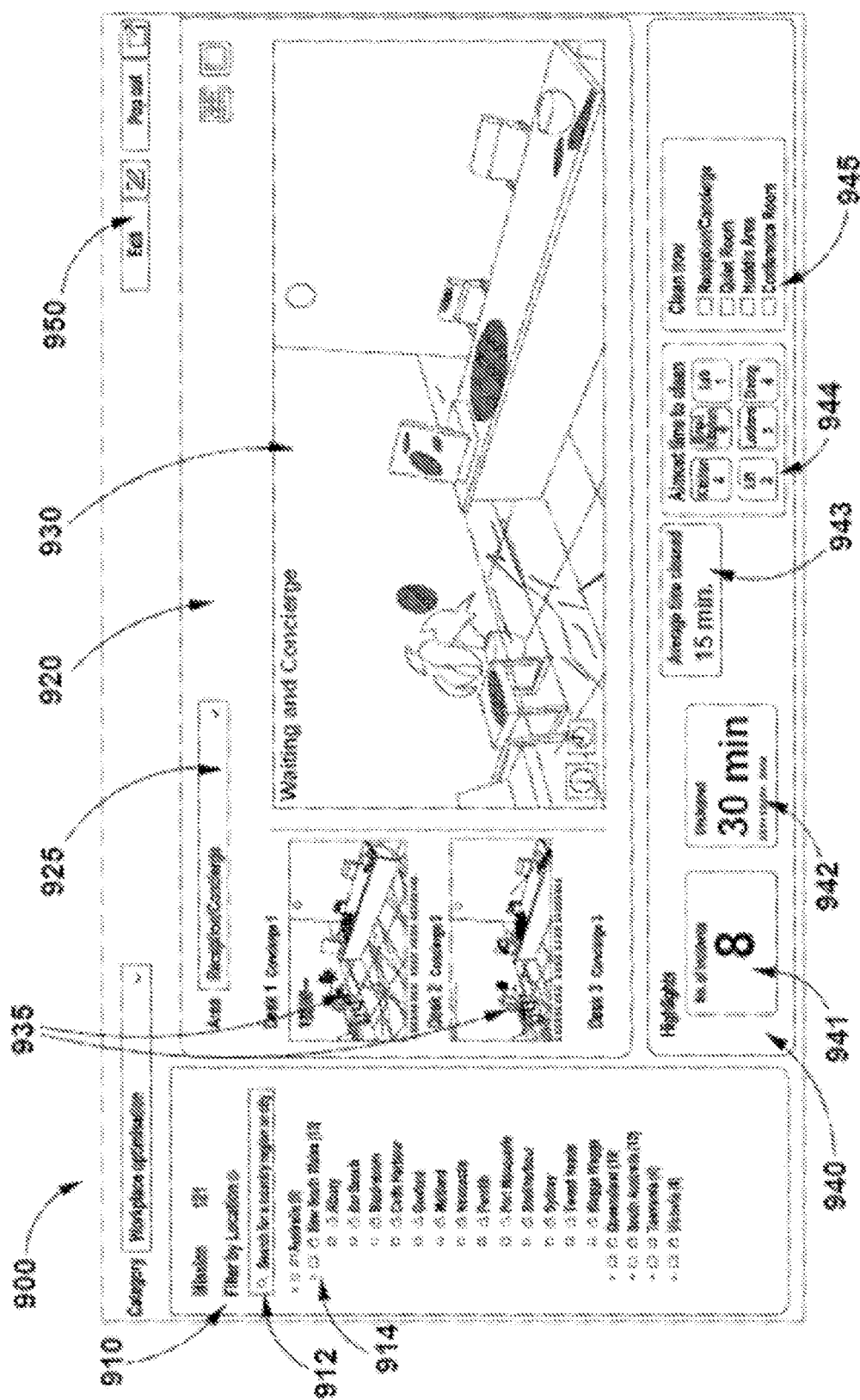
FIG. 9 shows an example screenshot of an application generated by the system of FIG. 1 for facilitating cleaning of shared surfaces.

A further alternative or additional example screenshot 900 that may be shown on a staff computing device 130 during step 830 of method 800 is shown in FIG. 9. Screenshot 900 may be shown on staff computing device 130 where staff computing device 130 is a desktop computer, for example. Screenshot 900 includes a location menu 910, allowing a user to filter monitored environments by location. For example, a user may search for a location using search bar 912, or select a location using expandable menu 914, which may be grouped by country, state, province and/or region in some embodiments.

Once a location is selected by a user, a monitoring window 920 may be displayed. Window 920 includes a drop-down box 925 that allows a user to select a specific area within the location for monitoring. In the illustrated embodiment, the area "Reception/Concierge" is selected. Based on the selected location and area, images 930 and 935 are displayed to the user. Image 930 may be a main view of the selected area for monitoring as captured by a sensor device 150, and may show a captured image of the area with an overlay showing areas that have been contacted or used. Images 935 may be alternative or supplemental main views of the selected area for monitoring as captured by additional sensor devices 150, and may also show captured images of the area with an overlay showing areas that have been contacted or used. As described above with reference to FIG. 6, areas with high use that need a deep clean may be indicated with a different color or symbol than areas that have had medium or low use. According to some embodiments, a user may be able to select one of the alternative images 935 to cause them to be shown as the main image 930, allowing the user to better see the area to be cleaned.

A highlights bar 940 is also shown on screenshot 900, corresponding to the selected location and area. Highlights bar 940 includes further information regarding the monitored area. For example, label 941 shows a number of incidents that have occurred in the monitored area that require cleaning. Label 942 shows a time since the area was last cleaned. Label 943 shows the average time it takes to clean the selected area. Label 944 shows other areas in the selected location that may need to be cleaned in the near future. Checkbox list 945 shows areas in the selected location that have exceeded a use threshold, and need to be cleaned.

Screenshot 900 also shows an edit button 950. Selecting button 950 may allow a user to edit a particular area to be monitored. For example, a user may be able to add or remove sensor devices 150 from the area, define surfaces to monitor, and set proximity and time thresholds that determine when a surface is considered to have been touched or interacted with.

Figure 10B:
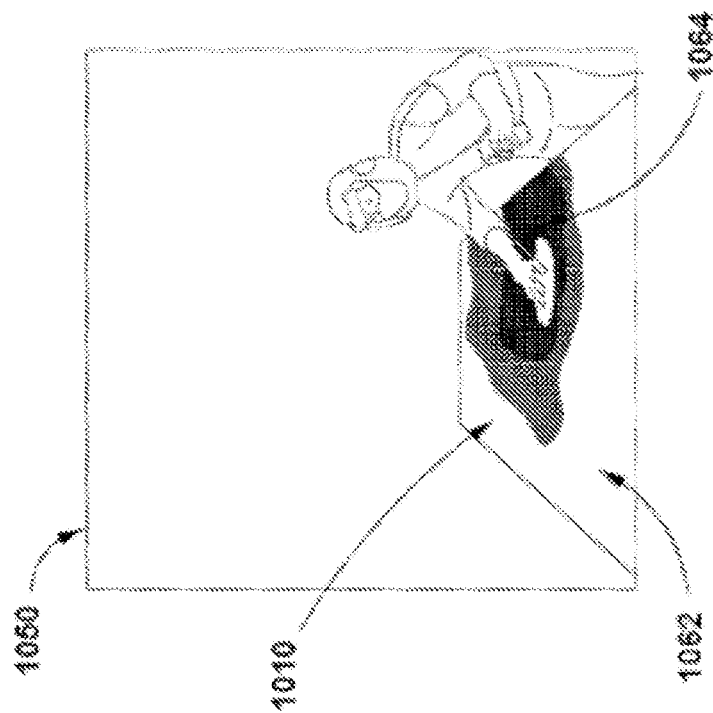
FIGS. 10A and 10B show an illustrative example of how contact and cleaning events are tracked by the sensor device of FIG. 1.
Figure 10A:
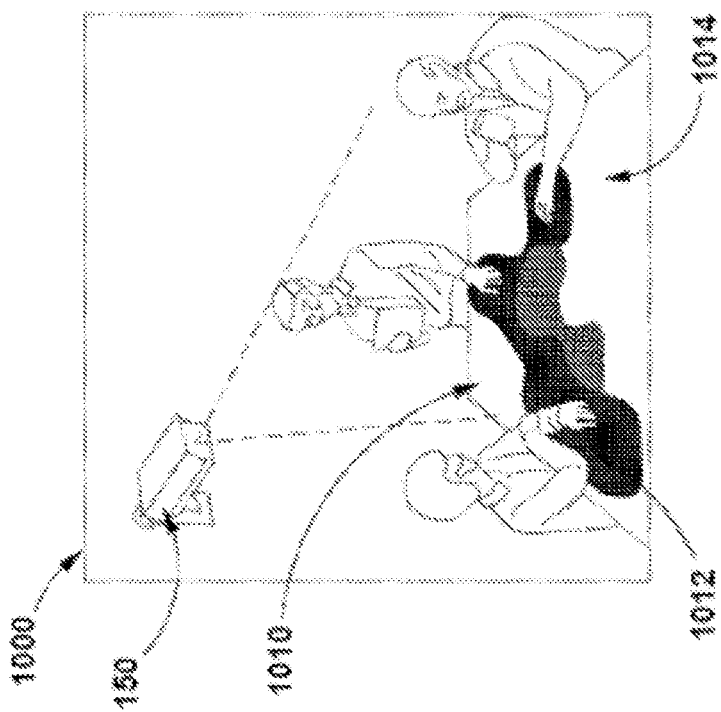

FIGS. 10A and 10B show further examples of how a shared surface may be monitored by system 100. FIG. 10A shows a shared surface 1010 in use. In the illustrated embodiment, surface 1010 is a meeting table. Surface 1010 is monitored by sensor device 150, which captures data relating to the use of and contact with surface 1010. As data about the use is captured, system 100 may develop a heat map of surface 1010, showing areas of high use in a warmer or darker color, for example. In the illustrated embodiment 1012 is an area having experienced high contact, while area 1014 has had little to no contact.

FIG. 10B shows a shared surface 1010 being cleaned. As the surface is cleaned, sensor 150 may capture the cleaning data and adjust the heat map. For example, in the illustrated embodiment 1062 had previously experienced high contact, and has not yet been cleaned. Area 1064, on the other hand, has now been cleaned, and so the heat map may be adjusted to return the color of area 1064 to a color indicating an uncontacted state.

Heat maps as generated by system 100 may be displayed to a user via staff computing device 130 to facilitate the cleaning process, and for compliance purposes to ensure a monitored area has been fully cleaned. According to some embodiments, the heat map may alternatively or additionally be displayed on an AR headset such as Google Glass, or may be projected onto the surface via a projector, to allow a user to clearly see the areas that need cleaning. Where the cleaning process is monitored by sensor device 150, a checklist such as checklist 945 or checklist 720 may not be required. Instead, processor 121 may determine that each surface of an area has been cleaned based on the data generated by sensor device 150. The heat map may be updated in real time as a user cleans the surface, or may be updated upon the user requesting a refresh of the heat map, or indicating that they have finished cleaning.

System 120 may also include further features to ensure compliance with a cleaning schedule. These features may include measures that determine whether a staff member received and/or responded to a notification or alarm that indicated that cleaning of an area was required, as described above with reference to FIGS. 3, 5A and 5B. The features may also include measures that determine whether a person attended the area in which cleaning was required, which may be determined by processing inputs received by touch screen display 115, sensor device 150, or other sensors. For example, where cleaning of a touch screen display 115 is required, a staff member may be required to interact with the display to indicate that they are on site and that they have begun the cleaning process, such as by interacting with slider 1270 as described above with reference to FIG. 12B. According to some embodiments, the staff member may be required to enter their staff identification number via touch screen display 115, or enter another code on touch screen display 115 that may be sent to them via staff computing device 130 to verify they are attending the required kiosk 110 for cleaning. According to some embodiments, a staff member may be required to take a photograph of display 115 using their staff computing device 130, to prove that they attended the site. Display 115 may be caused to show an identification number, as shown in FIG. 11, to show which kiosk 110 is being photographed, and staff computing device 130 may generate a timestamp at the time the photograph is taken to confirm that the staff member attended the site at the time required.

Where the area to be cleaned includes a sensor device 150, image recognition may be used to determine that a person attended the site. In some embodiments, the image recognition may identify user attributes to further ensure compliance, such as determining whether the person attending the site is wearing a uniform associated with a cleaning staff member, or using facial recognition to match the face of a person attending the site with the staff member that was allocated the task of cleaning the site.

Figure 14:
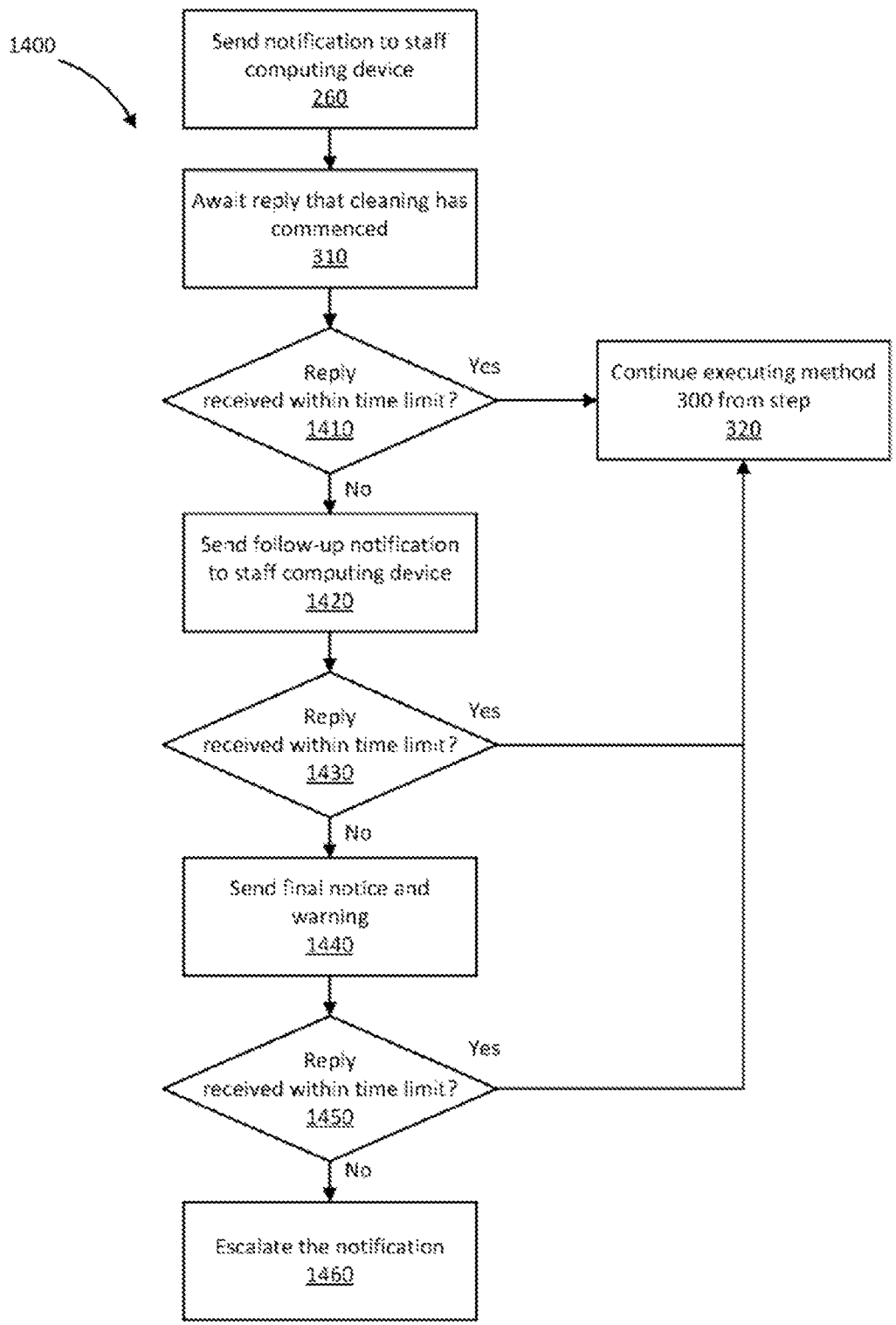
FIG. 14 shows a flowchart illustrating a method of escalating a cleaning process using the system of FIG. 1.

A further compliance measure may be to determine whether the person attending the site actually cleaned the surfaces that were required to be cleaned. When the site includes a kiosk 110, this may be done by tracking the cleaning process via display 115, as described above with reference to FIGS. 13A and 13B. Where the site includes a sensor device 150 this may be done by tracking the cleaning process via sensor 150, as described above with reference to FIG. 10B.

Where system 120 and particularly processor 121 determines that a required cleaning event did not occur, processor 121 may execute an escalation process, as shown in FIG. 14. FIG. 14 shows an example method 1400 for escalating a cleaning request.

Method 1400 begins with step 260 of method 200, as described above with reference to FIG. 2, during which server system 120 sends a notification to staff computing device 130 notifying them that a cleaning task is required. The notification may be sent by email, SMS, programmatic voice, or other messaging methods. According to some embodiments, more than one message may be sent using more than one messaging method. As shown in FIG. 5A, the notification may contain text such as "Proactive Maintenance Required. Device: NL 1456. Location: Lobby. Reply 1 to start cleaning." Method 1400 then progresses to step 310 of method 300, as described above with reference to FIG. 3, at which server system 120 awaits a reply from computing device 130 notifying server system 120 that cleaning has commenced.

At step 1410, processor 121 of server system 120 determines whether a reply was received from staff computing device 130 within a predetermined time period. According to some embodiments, the time period may be between 1 minute and 30 minutes. The time period may be around 5 minutes, for example. If processor 121 determines that a reply was received in the time limit, processor 121 proceeds to execute method 300 starting from step 320, as described above with reference to FIG. 3.

If a reply was not received within the time limit, at step 1420 processor 121 causes a follow-up notification to be sent to staff computing device 130. The follow-up notification may be sent by email, SMS, programmatic voice, or other messaging methods, and may be sent via the same or a different messaging method to that used to send the initial notification at step 260. According to some embodiments, more than one follow-up message may be sent using more than one messaging method. The follow-up notification may contain the same text as the initial notification, such as "Proactive Maintenance Required. Device: NL 1456. Location: Lobby. Reply 1 to start cleaning," for example.

At step 1430, processor 121 of server system 120 again determines whether a reply was received from staff computing device 130 within a predetermined time period. According to some embodiments, the time period may be between 1 minute and 30 minutes. The time period may be longer than the time period at step 1410, and may be around 25 minutes, for example. If processor 121 determines that a reply was received in this time limit, processor 121 proceeds to execute method 300 starting from step 320, as described above with reference to FIG. 3.

If a reply was not received within the time limit, at step 1440 processor 121 causes a final notice to be sent to staff computing device 130. The final notice may be sent by email, SMS, programmatic voice, or other messaging methods, and may be sent via the same or a different messaging method to that used to send the initial notification and the follow-up notification. According to some embodiments, more than one final notice message may be sent using more than one messaging method. The final notice may include text such as "Final Notice—Escalation in 15 mins. Device: NL 1456. Location: Lobby. Reply 1 to start cleaning," for example. Also at step 1440, processor 121 may cause a warning notification to be sent to an additional staff computing device 130, which may be a staff computing device belonging to a supervisor or manager of the staff member to which the first staff computing device 150 belongs. The warning may be sent by email, SMS, programmatic voice, or other messaging methods, and may be sent via the same or a different messaging method to that used to communicate with the first staff computing device 150. The warning may include text identifying the device or area to be cleaned, the location of the device or area, and the staff member that was responsible for the cleaning, being the staff member associated with the first staff computing device 150. The warning may include text such as "Escalation Warning in 15 mins. Device: NL 1456. Location: Lobby. Team member: John Smith," for example.

At step 1450, processor 121 of server system 120 again determines whether a reply was received from staff computing device 130 within a predetermined time period. According to some embodiments, the time period may be between 1 minute and 30 minutes. The time period may be around 15 minutes, for example. If processor 121 determines that a reply was received in this time limit, processor 121 proceeds to execute method 300 starting from step 320, as described above with reference to FIG. 3.

If a reply was not received within the time limit, at step 1460 processor 121 causes the task to be escalated. This may involve sending the initial staff member a message informing them that the task was being escalated. The message may also inform the staff member that they should expect to be contacted by their manager or supervisor. The message may include text such as "Escalating to your manager, Please standby for a call from your manager," for example. Also at step 1460, processor 121 may cause an escalation message to be sent to an additional staff computing device 130, which may be a staff computing device belonging to a supervisor or manager of the staff member to which the first staff computing device 150 belongs.

At step 1460, processor 121 may also initiate a call between the staff member and their manager. This may involve sending staff computing devices 130 belonging to the staff member and to their manager a message indicating a call is to be initiated, and then bridging a call between the two devices. The messages may be in the form of voice messages in some embodiments. For example, the staff computing device 150 belonging to the manager may be sent a voice message stating "Escalation. A team member has not responded to a proactive maintenance task assigned. Connecting you to John Smith." The staff computing device 150 belonging to the initial staff member may be sent a voice message stating "Escalation activated for Device NL1456. Connecting you to your manager. Please hold". Depending on the outcome of the telephone call, the task may be accepted by the staff member, assigned to a different staff member, or escalated further, in some embodiments.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:

1. A method for facilitating cleaning of a touch screen display, the method comprising:
   receiving touch event data from the touch screen display, the touch event data relating to at least one touch event recorded on the touch screen display, wherein the touch event data comprises location data relating to a location of the at least one touch event on the touch screen display;
   determining at least one touch metric based on the touch event data;
   comparing the touch metric to a predetermined threshold value;
   in response to determining that the touch metric exceeds the predetermined threshold value, initiating a cleaning procedure;
   in response to initiating the cleaning procedure, displaying the touch event data on the display in at least one location corresponding to the location data;
   receiving cleaning data from the touch screen display, the cleaning data relating to at least one touch event recorded on the touch screen display while the touch screen display is performing the cleaning procedure;
   comparing the cleaning data to the touch event data;
   in response to determining that the cleaning data corresponds to the touch event data, modifying the touch event data by erasing at least some touch event data, modifying the location data associated with at least some touch event data, and displaying modified touch event data on the display; and
   upon determining that all touch event data has been erased, determining that the touch screen display has been cleaned and terminating the cleaning procedure.

2. The method of claim 1, wherein initiating the cleaning procedure comprises causing the touch screen display to enter a cleaning mode, wherein causing the touch screen display to enter a cleaning mode comprises disabling inputs of the touch screen display.

3. The method of claim 1, wherein initiating the cleaning procedure comprises causing the touch screen display to enter a cleaning mode, wherein causing the touch screen display to enter a cleaning mode comprises causing touches recorded by the touch screen display to be recorded as cleaning touches.

4. The method of any claim 1, wherein initiating the cleaning procedure comprises causing the touch screen display to enter a cleaning mode, wherein causing the touch screen display to enter a cleaning mode comprises causing touch data recorded within a predetermined time period to be displayed on the touch screen display based on the location at which each touch event occurred.

5. The method of claim 1, further comprising sending a notification message to a staff computing device in response to determining that the touch metric exceeds the predetermined threshold value, the staff computing device being external to the touch screen display; and receiving a response to the notification message; wherein the cleaning procedure is initiated in response to receiving the response to the notification message.

6. The method of claim 1, wherein the touch event data includes at least one of:
   coordinate data relating to the location on the touch screen display at which the at least one touch event was recorded;
   time data relating to a time at which the at least one touch event was recorded; or
   type data relating to a type of touch event that was recorded.

7. The method of claim 1, further comprising:
   receiving data from at least one peripheral of the touch screen display, the data relating to at least one use event associated with use of at least one peripheral of the touch screen display;
   determining at least one use metric based on the data;
   comparing the use metric to a predetermined use threshold value;
   in response to determining that the touch metric exceeds the predetermined use threshold value, sending a notification message to a staff computing device; and
   in response to receiving a response to the notification message, initiating a peripheral cleaning procedure.

8. The method of claim 1, wherein the touch metric comprises a number of touches recorded within a predetermined time period.

9. The method of claim 1, further comprising awaiting a notification that cleaning has finished, and terminating the cleaning procedure upon receiving the notification, wherein terminating the cleaning procedure comprises causing the touch screen display to return to a normal operating mode.

10. The method of claim 1, further comprising determining that the touch metric does not exceed the predetermined threshold value and does exceed a predetermined warning threshold, sending a warning notification message a staff computing device.

11. The method of claim 1, further comprising determining that a response to a notification message was not received within a predetermined time period, and initiating an escalation procedure, the escalation procedure comprising sending an escalation message to an additional staff computing device, the additional staff computing device being external to the touch screen display.

12. The method of claim 1, wherein a response to a notification message is received from a staff computing device.

13. The method of claim 1, wherein determining that the cleaning data corresponds to the touch event data comprises determining that the cleaning data relates to touch events that occurred in a corresponding area of the touch screen display as the touch event data.

14. A system for facilitating cleaning of a touch screen display, the system comprising:
   a touch screen display; and
   a server system in communication with the touch screen display,
   wherein the server system is configured to:
      receive touch event data from the touch screen display, the touch event data relating to at least one touch event recorded on the touch screen display, wherein the touch event data comprises location data relating to a location of the at least one touch event on the touch screen display;
      determine at least one touch metric based on the touch event data;
      compare the touch metric to a predetermined threshold value;
      in response to determining that the touch metric exceeds the predetermined threshold value, initiate a cleaning procedure;
      in response to initiating the cleaning procedure, display the touch event data on the display in at least one location corresponding to the location data;

receive cleaning data from the touch screen display, the cleaning data relating to at least one touch event recorded on the touch screen display while the touch screen display is performing the cleaning procedure;

compare the cleaning data to the touch event data;

in response to determining that the cleaning data corresponds to the touch event data, modify the touch event data by erasing at least some touch event data, modifying the location data associated with at least some touch event data, and displaying modified touch event data on the display; and upon determining that all touch event data has been erased, determine that the touch screen display has been cleaned and terminating the cleaning procedure.

15. A method for facilitating cleaning of a shared surface, the method comprising:

receiving contact event data from an imaging device, the contact event data relating to at least one contact event determined to have occurred to the shared surface while not performing a cleaning procedure, wherein the contact event data comprises location data relating to a location of the at least one contact event on the shared surface;

determining at least one contact metric based on the contact event data;

comparing the contact metric to a predetermined threshold value;

in response to determining that the contact metric exceeds the predetermined threshold value, initiating a cleaning procedure;

in response to initiating the cleaning procedure, displaying the contact event data on a display device in at least one location corresponding to the location data;

receiving cleaning data from the imaging device, the cleaning data relating to at least one contact event determined to have occurred to the shared surface while performing the cleaning procedure;

comparing the cleaning data to the contact event data;

in response to determining that the cleaning data corresponds to the contact event data, modifying the contact event data by erasing at least some contact event data, modifying the location data associated with at least some touch event data, and displaying modified contact event data on the display device; and upon determining that all contact event data has been erased, determining that the shared surface has been cleaned and terminating the cleaning procedure.

16. The method of claim 15, wherein the contact event data includes at least one of:

coordinate data relating to the location on the shared surface at which the at least one contact event was recorded; or time data relating to a time at which the at least one contact event was recorded.

17. The method of claim 15, further comprising sending a notification message to a staff computing device in response to determining that the contact metric exceeds the predetermined threshold value; and receiving a response to the notification message; wherein the cleaning procedure is initiated in response to receiving the response to the notification message.

18. The method of claim 15, wherein the contact metric comprises a number of touches recorded within a predetermined time period.

19. The method of claim 15, further comprising awaiting a notification that cleaning has finished, and terminating the cleaning procedure upon receiving the notification.

20. A system for facilitating cleaning of a shared surface, the system comprising:

a sensor device; and a server system in communication with the sensor device, wherein the server system is configured to:

receive contact event data from an imaging device, the contact event data relating to at least one contact event determined to have occurred to the shared surface while not performing a cleaning procedure, wherein the contact event data comprises location data relating to a location of the at least one contact event on the shared surface;

determine at least one contact metric based on the contact event data;

compare the contact metric to a predetermined threshold value;

in response to determining that the contact metric exceeds the predetermined threshold value, initiate a cleaning procedure;

in response to initiating the cleaning procedure, display the contact event data on a display device in at least one location corresponding to the location data;

receive cleaning data from the imaging device, the cleaning data relating to at least one contact event determined to have occurred to the shared surface while performing the cleaning procedure;

compare the cleaning data to the contact event data;

in response to determining that the cleaning data corresponds to the contact event data, modify the contact event data by erasing at least some contact event data, modifying the location data associated with at least some touch event data, and displaying modified contact event data on the display device; and upon determining that all contact event data has been erased, determine that the shared surface has been cleaned and terminating the cleaning procedure.

* * * * *